(12) United States Patent
Peng et al.

(10) Patent No.: US 12,158,868 B2
(45) Date of Patent: Dec. 3, 2024

(54) DIFFERENTIALLY PRIVATE FREQUENCY DEDUPLICATION

(71) Applicant: Google LLC, Mountain View, CA (US)

(72) Inventors: Jiayu Peng, Sunnyvale, CA (US); Sheng Na Ma, Belmont, CA (US); Xichen Huang, Sunnyvale, CA (US); James Robert Koehler, Boulder, CO (US); Lu Zhang, Beijing (CN)

(73) Assignee: GOOGLE LLC, Mountain View, CA (US)

( * ) Notice: Subject to any disclaimer, the term of this patent is extended or adjusted under 35 U.S.C. 154(b) by 140 days.

(21) Appl. No.: 17/911,881

(22) PCT Filed: Jun. 23, 2021

(86) PCT No.: PCT/US2021/038716
§ 371 (c)(1),
(2) Date: Sep. 15, 2022

(87) PCT Pub. No.: WO2021/262868
PCT Pub. Date: Dec. 30, 2021

(65) Prior Publication Data
US 2023/0144763 A1    May 11, 2023

(30) Foreign Application Priority Data

Jun. 23, 2020   (WO) ................ PCT/US2020/039209

(51) Int. Cl.
*G06F 16/215* (2019.01)
*G06F 16/22* (2019.01)
(Continued)

(52) U.S. Cl.
CPC ........ *G06F 16/215* (2019.01); *G06F 16/2237* (2019.01); *G06F 16/2365* (2019.01); *G06F 21/6254* (2013.01)

(58) Field of Classification Search
None
See application file for complete search history.

(56) References Cited

U.S. PATENT DOCUMENTS

| 8,375,030 B2 | 2/2013 | Rane et al. |
| 8,978,158 B2 | 3/2015 | Rajkumar et al. |

(Continued)

FOREIGN PATENT DOCUMENTS

| CN | 108900619 | 11/2018 |
| JP | 2020/047103 | 3/2020 |

OTHER PUBLICATIONS

English Machine Translation of CN108900619(A) cited in IDS filed Sep. 15, 2022 (Year: 2018).*

(Continued)

*Primary Examiner* — Eddy Cheung
(74) *Attorney, Agent, or Firm* — DORITY & MANNING P.A.

(57) ABSTRACT

Systems and methods are disclosed herein for improved per-frequency counting systems that record interactions between individuals and a group of providers while maintaining differential privacy. A protocol may be defined that specifies frequency bins to categorize identifiers corresponding to individuals. A provider may generate a plurality of private sketches, each corresponding to a plurality of frequencies defined in the protocol. Frequency data is determined for each identifier. Identifiers are encoded into the private sketches corresponding to the identifiers' associated frequency. The plurality of private sketches from each provider in the group of providers are combined to generate a deduplicated distribution across the group. In one implementation, the private sketches of each provider are sequentially merged until all sketches have been combined, from which the total distribution can be estimated.

20 Claims, 11 Drawing Sheets

(51) Int. Cl.
    *G06F 16/23*     (2019.01)
    *G06F 21/62*     (2013.01)

(56) References Cited

U.S. PATENT DOCUMENTS

| | | |
|---|---|---|
| 2016/0019232 A1 | 1/2016 | Lambright |
| 2018/0349620 A1 | 12/2018 | Bhowmick et al. |
| 2018/0349636 A1 | 12/2018 | Bhowmick et al. |
| 2019/0026491 A1* | 1/2019 | Telford ............... G06F 21/6227 |
| 2019/0332681 A1 | 10/2019 | Hurry et al. |

OTHER PUBLICATIONS

International Search Report for Application No. PCT/US2021/038716, mailed on Oct. 11, 2021, 2 pages.
International Preliminary Report on Patentability for Application No. PCT/US2021/038716, mailed Jan. 5, 2023, 12 pages.

* cited by examiner

|  | Column 1 | Column 2 | Row Marginal |
|---|---|---|---|
| Row 1 | v11 | v12 | 1/3 |
| Row 2 | v21 | v22 | 1/3 |
| Row 3 | v31 | v32 | 1/3 |
| Marginal | ½ | ½ |  |

3x2 PSCA Sketch Representation

FIG. 4A

| Column 1: ½ | | | Column 2: ½ | | |
|---|---|---|---|---|---|
| v11 (1/6) | v21 (1/6) | v31 (1/6) | v21 (1/12) | v22 (1/12) | v32 (1/12) |

Flattened Representation of 3x2 PSCA Sketch

FIG. 4B

| Column 1: ½ | | | Column 2: ½ | | |
|---|---|---|---|---|---|
| v11 (p1) | v21 (p2) | v31 (p3) | v21 (p4) | v22 (p5) | v32 (p6) |

Flattened Representation of ADBF Sketch

FIG. 4C

DIFFERENTIALLY PRIVATE FREQUENCY DEDUPLICATION

PRIORITY CLAIM

This application is based upon and claims the right of priority under 35 U.S.C. § 371 to International Application No. PCT/US2021/038716 filed on Jun. 23, 2021, which claims the priority to International Application No. PCT/US2020/039209 filed Jun. 23, 2020. Applicant claims priority to and the benefit of each of such applications and incorporates all such applications herein by reference in their entirety.

BACKGROUND

In many instances, computing and data analysis systems may determine the intersection, or union, of large sets of data as part of analysis or processing of the data. Computing the union, intersection, or frequency of large sets of data distributed across multiple sources typically involves sharing information about the large sets of data between the multiple sources. Information from each source can include private or protected information, and sharing such information may negatively impact privacy and security.

SUMMARY

At least one aspect of the present technical solution relates to a method for generating a data structure for deduplicating data sets across a group of providers, the method comprising the steps of maintaining, by a data processing system comprising one or more processors and a memory, in a database, a data set of records corresponding to interactions between a plurality of users and a provider of the plurality of providers; generating, by the data processing system, a plurality of vector data structures, wherein the plurality of vector data structures correspond to a plurality of frequencies; determining, by the data processing system, frequency data of the plurality of users and the provider based on the data set of records; updating, by the data processing system, the plurality of vector data structures based on the frequency data, wherein at least one vector data structure of the plurality of vector data structures is updated to encode an identity of a user of the plurality of users based on the frequency data of the user; and sending, by the data processing system, the plurality of vector data structures to an analysis server for deduplication of the data set across the plurality of providers.

In some implementations, the analysis server combines the plurality of vector data structures with a second plurality of vector data structures from a second provider to generate a deduplicated distribution.

In some implementations, the vector data structures define coordinates for a plurality of counters, wherein updating the plurality of vector data structures comprises updating at least one counter in the plurality of vector data structures to encode the identity of the user.

In some implementations, updating the plurality of vector data structures further comprises determining a first coordinate of the plurality of vector data structures based on a hash function of the identity of the user.

In some implementations, the plurality of vector data structures each correspond to a particular frequency between one and a defined frequency threshold.

In some implementations, identities of the plurality of users are encoded into no more than one vector data structure of the plurality of vector data structures.

Various aspects of the present disclosure relate to a method for deduplicating data sets corresponding to frequencies of user interaction with a plurality of providers, the method comprising the steps of: receiving, by a data processing system comprising one or more processors and one or more memories, a first set of two or more vector data structures from a first provider of the plurality of providers and a second set of two or more vector data structures from a second provider of the plurality of providers, wherein the vector data structures correspond to a plurality of frequencies, and wherein each of the vector data structures encode identifiers according to a frequency of interaction associated with the identifiers; and combining, by the data processing system, the first set of two or more vector data structures and the second set of two or more vector data structures into a deduplicated frequency distribution, wherein the deduplicated frequency distribution defines a total frequency of user interaction of users associated with the identifiers across both the first provider and the second provider.

In some implementations, the method further comprises generating, by the data processing system, graphical user interface data comprising a representation of the deduplicated frequency distribution.

In some implementations, the method further comprises sending, by the data processing system, a threshold frequency to the plurality of providers, wherein the plurality of frequencies are defined by the threshold frequency.

In some implementations, the vector data structures in the first set of two or more vector data structures and in the second set of two or more vector data structures each correspond to a particular frequency between one and the threshold frequency.

In some implementations, the identifiers are encoded into no more than one vector data structure of the first set of two or more vector data structures and no more than one vector data structure of the second set of two or more vector data structures.

In some implementations, the vector data structures are vectors of counts (VOCs).

In some implementations, the vector data structures are any distribution bloom filters.

In some implementations, combining the first set of two or more vector data structures and the second set of two or more vector data structures into the deduplicated frequency distribution comprises the steps of: combining, by the data processing system, the first set of two or more vector data structures and the second set of two or more vector data structures into a first combined set of two or more vector data structures; receiving, by the data processing system, a third set of two or more vector data structures from a third provider of the plurality of providers; and responsive to combining the first set of two or more vector data structures and the second set of two or more vector data structures into the first combined set of two or more vector data structures, combining, by the data processing system, the first combined set of two or more vector data structures with the third set of two or more vector data structures from the third provider into a second combined set of two or more vector data structures.

In some implementations, combining the first set of two or more vector data structures and the second set of two or more vector data structures into the deduplicated frequency distribution comprises the steps of: determining an intersection between a first vector data structure of the first set of two or more vector data structures and a second data structure of the second set of two or more vector data structures; determining a number of users encoded in the intersection of the first vector data structure and the second vector data structure; and updating the deduplicated frequency distribution based on the determined number of users.

Various aspects of the present disclosure also relate to a system for reducing data sets received from a plurality of providers, the system comprising: a network interface configured to communicate with a plurality of servers associated with the plurality of providers; and one or more processors coupled to the network interface and a memory, the memory comprising instructions stored thereon that, when executed by the one or more processors, cause the one or more processors to: receive, via the network interface, a first set of private sketches from a first provider of the plurality of providers and a second set of private sketches from a second provider of the plurality of providers, the private sketches representing data sets of identifiers, the private sketches corresponding to a plurality of frequencies; generate a combined distribution using the first set of private sketches and the second set of private sketches, the combined distribution deduplicating the data sets represented by the first set of private sketches and by the second set of private sketches; and store, in a database, the combined distribution.

In some implementations, the one or more processors are further caused to: combine the first set of private sketches and the second set of private sketches into a merged set of private sketches; and store, in the database, the merged set of private sketches.

In some implementations, the one or more processors are further caused to: receive a third set of private sketches from a third provider of the plurality of providers; combine the merged set of private sketches and the third set of private sketches to generate a new merged set of private sketches; and store, in the database, the new merged set of private sketches.

In some implementations, the private sketches are vectors of counts (VOCs).

In some implementations, the private sketches are any distribution bloom filters.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. These and other aspects and features of the present technical solution will become apparent to those ordinarily skilled in the art upon review of the following description in conjunction with the accompanying figures, wherein:

FIGS. 4A-C depict illustrative examples of an any distribution bloom filter;

DETAILED DESCRIPTION

Figure 1:
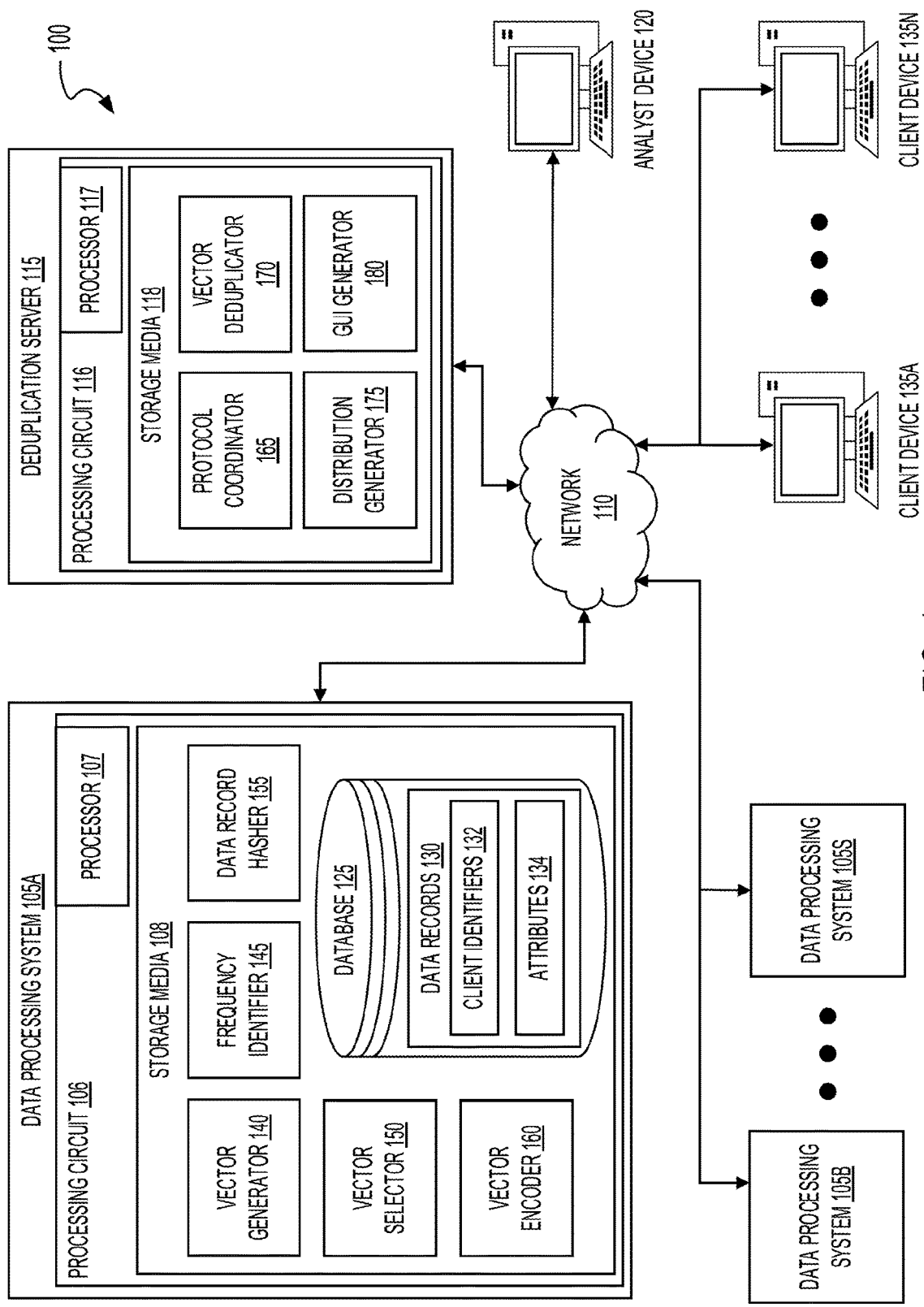
FIG. 1 depicts a block diagram illustrating an example implementation of a system for generating a set of private sketches to determine count and frequency of device identifiers.

Below are detailed descriptions of various concepts related to, and implementations of, methods, apparatuses, and systems of generating and combining private sketches of per-frequency reach data with increased accuracy and privacy while reducing size and complexity requirements of data exchange and storage. The various concepts introduced above and discussed in greater detail below may be implemented in any of numerous ways, as the described concepts are not limited to any particular manner of implementation. Examples of specific implementations and applications are provided primarily for illustrative purposes.

A group of providers may each interact with individuals in a population and may individually record the occurrence and frequency of said interactions. Here, an individual (used interchangeable with "user," "client," or "customer") may be associated with a frequency representing the number of times the individual has interacted with a provider for a particular type of interaction (e.g., particular content campaign, particular content item, particular set of content items, particular type/format of content item, particular category of content, etc.). The data sets maintained by each provider are protected to ensure the privacy of the individuals with which the providers interact, and thus the providers are not at liberty to share the details of their recorded data sets with other providers in the group. Yet, the group of providers may be interested to understand the total distribution of interactions for individuals across the entire group of providers per each interaction frequency. For example, a provider or analyst may wish to know how many individuals in the population had a total of 3 interactions with the group of providers, or how many had a total of 5 or more interactions with the group of providers, and so on.

One methodology includes deduplicating data sets of multiple providers to understand total reach (i.e., determining the number of individuals who have interacted with at least one provider of the group) using an encoded private sketch. A private sketch is a data structure that provides encoded information regarding identities of users without revealing the identity of users included in the private sketch. Private sketches are structured such that an analyst or automated server can deduplicate the data sets. Deduplication refers to removing entries that may be included multiple times in the data set. For example, a first provider may record interactions with each of Individual A and Individual B while a second provider records interactions with Individual A and Individual C, but when combining the two data sets, Individual A should only be recorded once such that a total of three individuals is recorded as the total reach across the first and second providers.

Nevertheless, such methodologies of data-set deduplication do not allow for a per-frequency analysis (e.g., per-frequency reach or distribution) due to privatization of protected personal information. For example, by encoding identities into a private sketch, a provider is barred from encoding the associated frequency data of individuals into the private sketch, which limits an analyst's ability to accurately deduplicate the data sets according to frequencies. Referring again to the illustrative example used above, deduplicating data sets in a per-frequency analysis means that if Individual A interacts twice with the first provider and once with the second provider, the data sets should be deduplicated such that Individual A is assigned or otherwise counted as having a total frequency of 3. Attempting to include frequency data in association with the user identifiers using such methodologies would increase the size, complexity, and induced error of a data-exchange protocol. It is generally desirable to reduce the size and complexity of data sets for improved storage and transmission of privatized information.

Providers are likewise limited from sharing anonymized data sets since providers would be able to re-identify individuals based on their universal identifier. One standard for data privacy in privatized data sets is to ensure data sets maintain differential privacy. Differential privacy generally stipulates that the privacy of a specific user included in the data set is roughly the same as the privacy of an individual not in the data set. Put another way, differential privacy obscures one's ability to determine if a specific user was or was not included in a data set.

The present disclosure provides a solution to these problems by defining a protocol and associated methods for deduplicating data sets for per-frequency analysis in a data-exchange processing system. Generally, a group of providers each generate a pre-defined number of private sketches where each private sketch corresponds to a particular frequency of interaction between individuals and the provider. Each provider can then share their set of private sketches such that a total distribution can be generated. The total distribution anonymously categorizes individuals by the total number of interactions with the entire group of providers (i.e., total frequency), such that a provider or analyst can understand how many unique individuals have interacted with the group of providers one time, how many individuals have interacted with the group two times, and so on. Thus, a differentially-private data exchange protocol can be utilized to reduce the size and complexity of exchanged data sets as well as to more accurately deduplicate data sets across the group of providers without exposing protected information.

A more detailed overview of the protocol is provided below, according to an illustrative implementation.

First, for a group of s providers, a threshold frequency is agreed upon by all providers, which can be designated as k.

Each provider i in the group of providers then individually generates k private sketches to privately encode identifiers associated with individuals with which provider i has interacted. The k private sketches are designated:

Sketch #1: identifiers with frequency f=1
Sketch #2: identifiers with frequency f=2
...
Sketch #(k−1): identifiers with frequency f=(k−1)
Sketch #k: identifiers with frequency f>=k (used interchangeably with f=k+)

Thus, each identifier in the provider's records can be encoded into exactly one of the k private sketches based on the number of interactions between the individual and the provider i.

If there exists an individual with which the provider i has not interacted (which often is the case), that individual is not encoded into any of the private sketches for provider i.

Each of the s providers generate a set of k private sketches, which can be combined to form a total distribution across all s providers. The per-frequency reach (i.e., the total number of individuals with particular number of interactions across the group of providers) for a particular frequency $\omega$ can be represented by the notation:

$$R_w = R(f_1 + f_2 + \ldots + f_s = w)$$

where each R is a function that outputs the total number of unique individuals with a total frequency of w based on various combinations of frequencies at each of the s providers. As an illustrative example, for w=3, an individual would be counted in the total reach of frequency bin $R_3$ if the individual, say, interacted twice with provider (1) ($f_1=2$), once with provider (2) ($f_2=1$), and had no interactions with any of the remaining providers ($f_3, \ldots, f_s=0$).

Several methods may be used to estimate the per-frequency reach $R_w$, which will be described in more detail in subsequent sections. One such method combines the individual sketches of the providers to generate a combined set of sketches, from which the total distribution can be computed. Another such method generates the total distribution directly from the sets of sketches based on intersections and unions of individual sketches.

A technical advantage of the disclosed methods and systems is the reduction of size and complexity for transmission and storage of privatized data sets. As described above, data sets are encoded into private sketches, which reduce the total size of the data set. Additionally, the present solution reduces the complexity of per-frequency, differentially-private data sets compared to other differential-private exchange protocols designed for per-frequency analysis.

A second technical advantage is realized in improving the accuracy of deduplicated data set from the privatized data structures. Differential privacy (DP) may be tested by defining a non-zero error value ε corresponding to the level of confidence in determining statistically whether an individual is included in a data set or not. The ε value is thought of as the marginal difference between two identical data sets that differ only in whether they include or do not include an individual. Differential privacy is maintained when the level of confidence is less than ε. For smaller data sets, changes to data sets will be proportionally larger, noise (sometimes referred to as DP-noise) may be added to the data sets to maintain the ε-DP threshold. Likewise, for distributions with larger deviation, as would be the case for encoding frequency data using the aforementioned methodologies, a higher percentage amount of DP-noise would be added to maintain differential privacy, thus inducing increased error in the estimate of the total distribution. By not encoding the frequency data in the private sketches in association with the identifier, the present solution thus increases the accuracy of the deduplicated data.

An example use case for the systems and methods described here may relate to the medical industry. For example, a group of hospitals may each provide services to a city or region and, while each hospital can internally record the number of interactions with specific patients, the hospitals may be interested to understand how frequently patients are receiving a provided service across the group of hospitals (e.g., ER visits). However, due to legal restrictions on sharing protected personal information, the hospitals may not be allowed to share the identities of patients they have provided the service to, and thus are unable to share their data freely to calculate a deduplicated distribution of how often patients have received the service. The present solution provides a secure way for data processing systems of the multiple hospitals to share privatized patient information that still allows for a total distribution to be estimated.

Another example use case for the system and methods described here may relate to online advertisements. An online marketer can pay to have an advertisement displayed on multiple websites. The marketer, to better understand how their potential customers, may wish to understand how often internet users have seen their advertisement across the multiple websites. However, due once again to privacy concern of user data online, the website servers may not be permitted to share with others who has accessed their website or how many times a specific user has seen a webpage containing the advertisement. The solution described herein allows for the websites to privately share marketing data without exposing sensitive user information, such that an advertiser can understand how many people have seen their advertisement how many times.

Referring now to FIG. 1, a system 100 is shown for frequency deduplicating data sets from multiple providers to generate a total reach distribution of interaction data. The system 100 can include at least one data processing system 105A-S (sometimes generally referred to as data processing system 105), at least one network 110, at least one deduplication server 115 (used interchangeably with analysis server), and at least one analyst device 120. In some implementations, system 100 includes at least one client device 135A-N (sometimes generally referred to as client device 135). The data processing system 105 includes a processing circuit 106 with at least one processor 107 and a storage media 108 comprising at least one vector generator 140, at least one frequency identifier 145, at least one vector selector 150, at least one data recorder hasher 155, and at least one vector encoder 160. The database 125 can include at least one data record 130 which may include client identifiers 132, and corresponding attributes 134. Likewise, the deduplication server 115 includes a processing circuit 116 with at least one processor 117 and a storage media 118 comprising at least one protocol coordinator 165, at least one vector deduplicator 170, at least one distribution generator 175, and at least one GUI generator 180.

Figure 10:
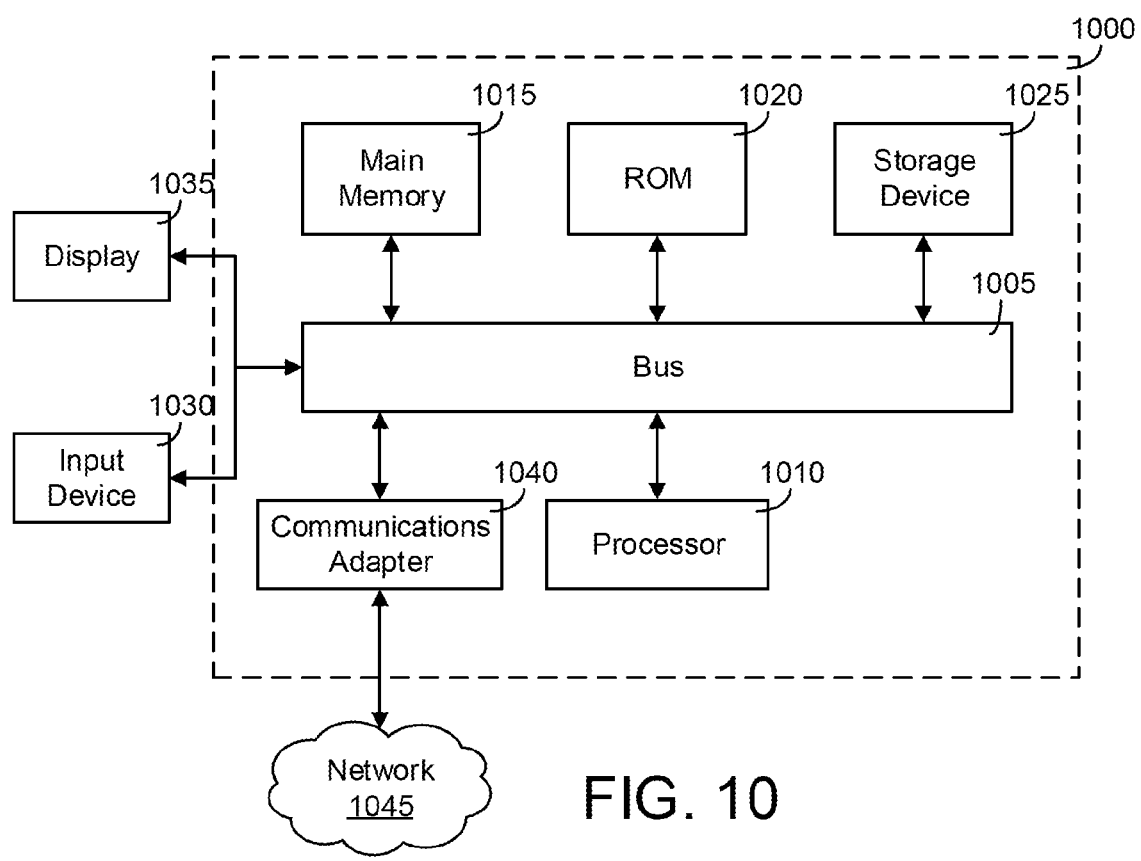
FIG. 10 shows the general architecture of an illustrative computer system that may be employed to implement any of the computing/processing devices and circuits discussed herein.

Each of the components (e.g. the data processing systems 105, the network 110, the deduplication server 115, the analyst device 120, the client devices 135) of the system 100 can be implemented using hardware components, software (instructions stored on one or more computer-readable storage media), or a combination thereof (e.g., the hardware components or a combination of software with the hardware components of a computing system 1000 detailed herein in conjunction with FIG. 10). For example, the data processing system 105 can include servers or other computing devices. The analyst device 120 can include servers or other computing devices. Likewise, the sub-components of the data processing system 105 and deduplication server 115 (e.g., vector generator 140, frequency identifier 145, vector selector 150, data recorder hasher 155, vector encoder 160, protocol coordinator 165, vector deduplicator 170, distribution generator 175, and GUI generator 180) can be implemented as distinct or combined hardware and/or software elements to perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with the another data processing system 105A-S, deduplication server 115, and/or analyst device 120. The network 110 may be any form of computer network that relays information between the deduplication server 115, data processing system 105, and one or more other sources, such as web servers. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The deduplication server 115 may communicate wirelessly (e.g., via WiFi, cellular, radio, etc.) with a transceiver that is hardwired (e.g., via a fiber optic cable, a CAT5 cable, etc.) to other computing devices in the network 110. The deduplication server 115 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein The database 125 can be a database configured to store and/or maintain any of the information described herein. The database 125 can maintain one or more data structures which can contain or index each of the values, pluralities, or thresholds described herein. The database 125 can be accessed using one or more memory addresses or index values. The database 125 can be accessed by the components of the data processing system 105, or in some implementations the analyst device 120, via the network 110. In some implementations, the database 125 can exist external to the data processing system 105, and may be accessed via the network 110. The database 125 can be distributed across many different computer systems or storage elements, and may be accessed via the network 110 or a suitable computer bus interface. The data processing system 105 can store, in the database 125, the results of any or all computations, determinations, selections, identifications, generations, constructions, or calculations in one or more data structures indexed with appropriate values, each of which may be accessed by the data processing system 105 or the client devices 135 to perform any of the functionalities or functions described herein.

The analyst device 120 can be a computing device configured to communicate via the network 110 to display data such as an indication provided by the data processing system 105 (e.g., an indication displaying the cardinality of the sets of client identifiers 132, the attributes 134, frequency values, or any other values described herein, etc.). The analyst device 120 can be desktop computers, laptop computers, tablet computers, smartphones, personal digital assistants, mobile devices, consumer computing devices, servers, clients, digital video recorders, a set-top box for a television, a video game console, or any other computing device configured to communicate via the network 110, among others. The analyst device 120 can transmit or receive one or more client identifiers 132 or one or more attributes 134 to the data processing system 105. The analyst device 120 may in some implementations communicate with at least one database 125 to store client identifiers 132 or attributes 134 in association with the respective analyst device 120.

The analyst device 120 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The analyst device 120 can include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the analyst device 120 (e.g., a built-in display, microphone, etc.) or external to the housing of the analyst device 120 (e.g., a monitor connected to the analyst device 120, a speaker connected to the analyst device 120, etc.). In some implementations, the analyst device 120 may include an electronic display, which visually displays interfaces using interface data provided by an operating system executing on the analyst device 120, retrieved from the database 125, or provided by the data processing system 105.

The client device 135 can be a computing device configured to communicate via the network 110 to display data such as an indication provided by the data processing system 105 (e.g., an indication displaying the cardinality of the sets of identifiers 132, the attributes 134, frequency values, or any other values described herein, etc.). The client devices 135 can be desktop computers, laptop computers, tablet computers, smartphones, personal digital assistants, mobile devices, consumer computing devices, servers, clients, digital video recorders, a set-top box for a television, a video game console, or any other computing device configured to communicate via the network 110, among others. The client device 135 can transmit or receive one or more client identifiers 132 or one or more attributes 134 to the data processing system. The client devices 135 can communicate with at least one database 125 to store client identifiers 132 or attributes 134 in association with the respective client device 135.

The client device 135 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 135 can include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 135 (e.g., a built-in display, microphone, etc.) or external to the housing of the client device 135 (e.g., a monitor connected to the client device 135, a speaker connected to the client device 135, etc.). In some implementations, the client device 135 may include an electronic display, which visually displays interfaces using interface data provided by an operating system executing on the client device 135, retrieved from the database 125, or provided by the data processing system 105.

Accordingly, client devices 135 may interact with the data processing systems 105 of the one or more providers via the transmission of provider content via a webpage or application, such as content associated with a content campaign of a provider relating to a particular category, item, or product. Interactions between users and providers may include webpage download, subscriptions, views, clicks, or any other type of interaction.

The data processing system 105 can maintain, in the database 125, at least one data record 130. The data record 130 can include, for example, at least one client identifier 132 and at least one attribute 134. The client identifier 132 can correspond to a user (used interchangeably with client), client devices 135, or other proxy associated with a user. The attribute 134 can be associated with the client identifier 132 in the data record 130, and include information about the attributes of the respective clients. The attributes can include, for example, client device location data, client device metadata, client device parameters, settings, and other information, user profile data, interactions performed by the client device 135, application browsing history, web page browsing history, activity information, device characteristics, whether the client device 135 has viewed or interacted with a content item, network utilization information, power utilization information, and device operating system version, settings, and other information, among others. The data processing system can receive a device identifier and attribute data from each of the client devices 135, and generate and maintain a respective data record in the database 125 that corresponds to the respective client device 135. In some implementations, each of the data processing systems 105 may only receive client device identifiers and information from a particular set of users or client devices 135. The data processing systems 105A-S may maintain their respective data records in their own database 125 that cannot be accessed by the other data processing systems 105A-S. According to some implementations, different groups of the users may be serviced by different identifier servers (e.g., the data processing systems 105), and each data processing system may maintain its own set of data records that correspond to a respective one of its set of users.

In various implementations, each of the data processing system 105A-S may be associated with a provider in a group of providers. Data processing systems 105A-S may thus record and manage data relating to interactions between the respective provider and individuals in a population. In some implementations, providers in the group of providers may leverage multiple data processing systems 105 to implement the functionality described herein. In some implementations, data processing systems 105A-S may be configured to communicate with client devices 135 associated with users via the network 110 and record interactions with the associated client devices 135.

Data processing system 105 is shown to include vector generator 140 which can be configured to generate vector data structures for encoding data sets. Vector generator 140 can generate a vector comprising a plurality of coordinates. To generate a vector, the vector generator 140 can allocate one or more regions of memory in the data processing system 105 to accommodate at least one counter register. The allocated counter register can correspond to at least one coordinate of the vector. By generating and allocating memory for one or more counter registers, the vector generator 140 can generate the vector comprising the counter registers. The vector generator 140 can initialize each of the counter registers of the vector to an initialization value, for example zero, or one. The vector generator 140 can generate the vector, which may correspond to a bloom filter, to have any number of counter registers (sometimes referred to as "buckets"). For example, the vector generator 140 can receive an indication to generate a bloom filter with n buckets, or may access an internal configuration setting, provided by an external computing device, that specifies the size of the bloom filter by number of buckets or counter registers.

Likewise, the vector generator 140 may be configured to receive an indication of a number of vectors to generate for a set of vectors. In some implementations, the vector generator 140 may receive a designation of frequency bins to associate with the set of generated vectors. The vector generator 140 may annotate or otherwise associate each vector in the set of vectors with a corresponding frequency in the frequency designations. In some implementations, the designations may be received from deduplication server 115. In some implementations, the frequencies each correspond to a single frequency. In some implementations, some designations may correspond to a range of frequencies. In one implementation, the frequency designation specifies a set of frequency bins $(1, 2, \ldots, k-1, k+)$. As would be appreciated, a different arrangement of frequency designations may be used for the set of private sketches. For example, additional private sketches may be included, such as a private sketch representing 1+. In some implementations, the private sketches in a set may each correspond to one of $(1+, 2+, \ldots, k+)$.

Frequency identifier 145 is configured to determine the frequency data associated with a client identifier 132. In some implementations, frequency identifier 145 may determine the frequency data of client identifier 132 based on data stored in attributes 134. For example, frequency identifier 145 may determine the number of times a client identifier appears in data records 130. In some implementations, the frequency identifier 145 determines the frequency of a particular service or interaction, and thus may not count all interactions associated with the client identifier. In some implementations, the frequency identifier 145 stores the frequency data as part of the attributes 134 in association with the client identifier 132. In some implementations, the frequency identifier 145 may periodically or continually update frequency data for client identifiers 132. The frequency data determined by frequency identifier 145 may subsequently be accessible or otherwise communicated to vector selector 150 to be used to encode identifiers into a private sketch corresponding to the frequency data associated with the identifier.

Vector selector 150 is configured to determine the appropriate sketch in the set of sketches in which to encode an identifier. Vector selector 150 may access or otherwise retrieve frequency data generated by frequency identifier 145 to determine the appropriate sketch corresponding to the associated frequency. In some implementations, vector selector 150 determines a single sketch in the set of vectors to encode an identifier. In other implementations, vector selector 150 may determine whether to encode an identifier in multiple vectors.

Data record hasher 155 can identify one or more hash functions from a list of hash functions that are usable to encode identifiers in a vector data structure. For example, each of the hashes identified in the list of hashes can provide a normal distribution or expectation of randomness based on input value. That is, for example, similar inputs to the hash function do not necessarily have similar outputs to the hash function. The hash functions can be chosen as optimal hash functions for bloom filters. For example, the data record hasher 155 can choose independent and uniformly distributed hash functions. Such hash functions can include, for example, murmur hashes, Fowler-Noll-Vo series hashes, or Jenkins hashes, among others. The data record hasher 155 can select or identify a number of hash functions, and apply each hash function to each data record to generate a hashed set of data records.

The data record hasher 155 can hash each of the data records maintained by the respective data processing system 105 to create a respective set of hashed data records. Applying the hash data records can include using the data record as an argument to the hash functions identified by the data record hasher 155. The data record hasher 155 can hash each of the data records using each of the hashes identified, thereby resulting in a number of hashed values that correspond to a respective one of the data records. As such, the data record hasher 155 can iterate over each of the data records in a loop, and apply each of the hash functions to each data record as they are selected. After applying the hash functions, the data record hasher 155 can store each of the hashed data records in association with the respective data record in the memory of the respective data processing system 105. The data record hasher 155 can further extract a register identifier from each of the hashed data records that correspond to each of the data records maintained by the respective data processing system 105. Each of the hashed data records of the hashed data record set can correspond to a counter register of the vector generated by the vector generator 140. To identify the corresponding counter registers, the data record hasher 155 can extract a register identifier from each of the hashed data records. The data record hasher 155 can extract the register identifiers, for example, by performing a modulus operation on each hashed data identifier with the number of counter registers in vector.

Vector encoder 160 is configured to update the counter registers in the vector based on the output of the data record hasher 155. For example, the vector encoder 160 may receive coordinates of the vector data structure from the data record hasher 155 in which to encode an identifier, and the vector encoder 160 updates the counter registers accordingly. Vector encoder 160 may implement one of various counting structures, such as a bloom filter or vector of counts, for example. Vector encoder 160 may be configured to determine whether an identifier has already been encoded into at least one of the vectors. In some such implementations, vector encoder 160 may store an attribute 134 designating whether a data entry has been encoded into a sketch. Vector encoder 160 may be configured to iterate over a set of data entries, and via communication with the frequency identifier 145, vector identifier 150, and data record hasher 155, facilitates encoding of a data set into the set of vectors generated by vector generator 140. In some implementations, the vector encoder 160 may be configured to store the updated vectors in memory, such as database 125.

With reference to the deduplication server 115, the deduplication server 115 may be configured as a separate server with which the data processing systems 105 communicate. In some implementations, the functionality and features of the deduplication server 115 is included in one or more data processing systems 105, such that the data processing systems 105 deduplicate the plurality of data sets via direct communication with the other data processing systems 105. For example, data processing system 105A may query the data processing systems 105B-S requesting each data processing systems' set of private sketches, from which data processing system 105A generates the deduplicated distribution of the data sets. In another example, the data processing systems 105A-S are configured to automatically generate and send their respective set of private sketches to the other data processing systems 105 according to a predetermined time interval or trigger (e.g., every day, month, year, etc.). In one implementation, the functionality of the deduplication server 115 is distributed across multiple data processing system 105.

Deduplication server 115 is shown to include protocol coordinator 165. Protocol coordinator 165 may communicate standardized protocol parameters to each of the data processing systems 105. Protocol parameters may include, but are not limited to, frequency designations, type of data structure, length or size of the data structure, and hash functions. Protocol coordinator 165 may determine protocol parameters based on user input received from a user device, such as analyst device 120. Protocol coordinator 165 may facilitate requests to data processing systems 105 to retrieve sets of private sketches for each provider. Protocol coordinator 165 may store protocol parameters in memory of the deduplication server 115 for later reference.

Vector deduplicator 170 comprises logic configured to deduplicate sets of vectors received from the data processing systems 105. Vector deduplicator 170 may implement one or more algorithms for deduplication, which may include vector operations such as intersection, union, or set difference. In some implementations, vector deduplicator 170 determines the preferred deduplication algorithm based on the size or number of data sets. In some implementations, vector deduplicator 170 generates a deduplicated set of vector data structures that represent the comprehensive data set. In such implementations, vector deduplicator 170 may be configured to generate and store sets of vectors based on the plurality of encoded data sets.

Distribution generator 175 is configured to determine the per-frequency count of the total distribution (used interchangeably with histogram). In some implementations, distribution generator 175 determines the total deduplicated distribution based on a combined set of vectors received from vector deduplicator 170. In some implementations, distribution generator 175 estimates the total distribution directly from the received sketches. To determine the count for a particular frequency, distribution generator 175 may determine the cardinality of a vector. In some implementations, HyperLogLog (HLL) is used as a cardinality estimator. A cardinality estimator can estimate the number of elements in some multiset M that is in practice very large. HLLs can be characterized by low error rates, low variance, and low memory usage. Moreover, the union of two HLLs can be trivial to compute, meaning that HLLs can be implemented in distributed counting applications. An extension of HLL, called FreqLogLog (FLL), can allow the number of elements in M along with their frequencies to be estimated. Other counting estimators may be used by distribution generator 175. Distribution generator 175 may store the total distribution in a memory of deduplication server 115. In some implementations, distribution generator 175 sends the distribution data to the data processing system 105 or the analyst device 120.

GUI generator 180 is configured to generate data pertaining to a graphical user interface (GUI) that comprises a representation of the generated distribution. In one implementation, GUI generator 180 generates graphical elements that provide a visual representation of the distribution for display to an analyst. In some implementations, GUI generator 180 maintains webpage data comprising the representation of the distribution and is accessible via the network 110. GUI generator 180 may send the generated GUI data to a user device for display, such as analyst device 120. In other implementations, GUI data is generated by the analyst device 120 based on data received from the deduplication server 115.

Figure 2:
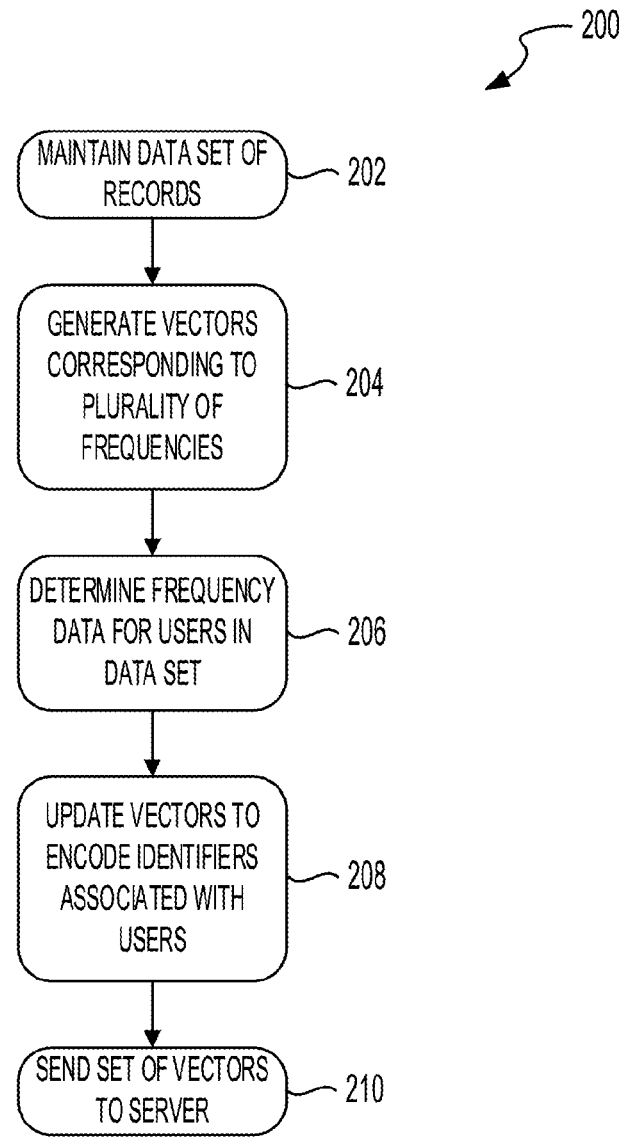
FIG. 2 depicts a flow diagram of a process for encoding a data set into a set of private sketches.

Referring now to FIG. 2, a process 200 for generating a set of k vector data structures is shown, according to several implementations. Process 200 may be executed by one or more processors coupled to a memory, such as any of the processing systems 105A-S. Process 200 generally compresses and privatizes a data set corresponding to interactions between a provider and users into a set of private sketches. Accordingly, the generated set of k vector data structures reduces the size of the data set and maintains differential privacy of the identifier values.

At 202, the one or more processors maintain data records corresponding to user interaction with a particular provider in the group of providers. Data records may be maintained in a database over time as users interact with the particular provider. Data records may include, but are not limited to, an identifier uniquely identifying a user, a type of interaction, a timestamp associated with an interaction, or frequency data, and combinations thereof. In some implementations, data records may include protected personal information and may be encrypted or otherwise stored in a manner to protect said private information.

In some implementations, the one or more processors receive a designation of frequencies for use in generating private sketches. In some implementations, the frequency designations may be received as a pre-defined set. In some implementations, the designation is a frequency threshold k, wherein the designated frequency bins are understood to be defined as the set $\{1, 2, \ldots, k-1, k+\}$. Other protocol information may be received at 204 as well, such as the type of private sketch that should be generated, the size of the private sketch, hash functions, or other parameters of the data structure used to implement the private sketch.

In some implementations, general information regarding a provider's data set may be sent to a central server (e.g., deduplication server 115) to customize parameters of a data-exchange protocol. For example, a provider may determine the total number of individuals in a data set, and send the determined number to the central server. The central server may then determine, for example, the optimal vector size to use to define in the protocol, which may be received by the providers in the group at step 204.

At 204, a plurality of vector data structures are generated based on frequency designations. In one implementation, each vector in the plurality of vector data structures corresponds to a particular frequency bin. A frequency bin may represent a single frequency, multiple frequencies, or a range of frequencies. In various implementations, the plurality of vector data structures may be VoCs. In some implementations, the plurality of vector data structures may be bloom filters. The vector data structures may define coordinates corresponding to a plurality of counting registers. The plurality of vector data structures may be initialized with initial values in each of the registers.

At 206, frequency data is determined for identifiers associated with users in the maintained data set based on corresponding attribute data in the data set. For example, the number of interactions in the data set identifying the identifier may be counted to determine the frequency of interaction involving the identifier. In some implementations, the frequency data is determined for a particular service or type of interaction. In some implementations, the frequency data is stored as part of the retrieved attributes in the data set. A vector in the set of vector data structures is selected based on frequency data. The selected vector may be the vector corresponding to the frequency bin that encompasses the frequency data associated with an identifier.

At 208, at least one vector in the set is updated to encode the identifiers. Updating the selected vector may include determining coordinates in the vector based on one or more hash functions and incrementing one or more counting registers corresponding to the identified coordinates. In some implementations, each identifier is only encoded into one vector of the set based on the frequency data associated with the identifier. In some implementations, a counting register is not updated based on the counting protocol and the value that is currently stored in the counting register. Details of vector encoding are described in subsequent sections.

In some implementations, the processors may retrieve data records iteratively for entries or identifiers in the data set, determine the frequency data for each identifier individually, and update one or more vectors of the set before iterating to the next entry in the data set.

At 210, once all data entries of interest have been encoded into the plurality of vector data structures, the set of private sketches is sent to a requesting server for processing. In some implementations, the set of private sketches may be stored, either temporarily or for a prolonged period of time, for later use or update. For example, a server may incrementally update the plurality of vector data structures as new entries in the data set are recorded by the processors.

Various implementations of the configuration of the private sketches will be discussed in more detail below.

One type of private sketch that may be used in the disclosed system and methods is a vector of counts (VoC). A VoC may be generally represented as a vector with a plurality of counters (buckets, bins, etc.) that correspond to various entries in the vector. A VoC may be a one-dimensional vector that defines a plurality of counter values. A VoC may be implemented as a vector data structure, where a vector data structure is generally defined as a designation or configuration of computer memory such that a processor can implement operators on and retrieve stored values from memory locations defined by the data structure that correspond to the defined counters. Counters in the vector data structures may be configured as bits, one or more bytes, or another higher-order data type.

Another type of private sketch that may be used in the present solution is a bloom filter. Bloom filters can provide a compact representation of a set. Bloom filters may also be implemented as vector data structures and can implement both an insert and contains method; however, due to the compact representation there is a small probability of the method returning a false positive. This means that an element may be said to be in the set when it may not be in the set. On the other hand, false negatives are precluded, that is if the contains method returns false it may be always correct.

An empty bloom filter can be a bit array of size m with all of its bits set to zero. An element, x, can be inserted by passing it through k hash functions modulus m, and then setting the corresponding bits in the Bloom filter to 1 (see example below). The method can work in a similar fashion, and may return true if all k hashes of x modulus m are set to 1 and false otherwise.

Due to their comparatively high memory requirements, (e.g., with respect to HLLs), Bloom filters may not be typically used for cardinality estimation, however the cardinality of a Bloom filter can be determined by evaluating the following formula:

$$n \approx \frac{-1}{m}\ln\left(1 - \frac{x}{m}\right)$$

where x is the number of ones (active bits) in the bloom filter, m can be the number of bits in the bloom filter, and n can be the number of the estimate of the cardinality of the bloom filter. The variance of the estimator is approximated by the following equation:

$$m * \left(e^{\frac{n}{m}} - 1\right) - n$$

where n is the true set cardinality in the bloom filter.

The variance can be derived based on a Taylor expansion.

The sketches described in this section may also be referred to generally as an 'Any Distribution Bloom Filter' (ADBF). The sketches described in this section can include allow for bit distributions that can accommodate alternate distribution functions, other than uniform or exponential. For example, the techniques described herein can implement a linearly decaying bloom filter (BF), hyperbolic BF, or a mixture of uniform and exponential BF. Noise correction can be applied efficiently by one or more data processing systems or servers (e.g., data processing systems 105 or deduplication server 115).

Further, the estimation techniques implemented by the data processing system or server (e.g., data processing systems 105 or deduplication server 115) can be implemented such that all bits of the sketch can contribute to the cardinality estimation, unlike in a reference legion based implementation, where only the bits of the reference legion are used. Instead of selecting a reference legion, the data processing system can tune the weights of each bit in the sketch, where the weight value indicates the contribution of a bit in the sketch to the final cardinality estimate. Based on the parameters of the sketch, the data processing system can derive the optimal weights for each bit in the sketch to improve the overall accuracy of the cardinality estimation.

Figure 3:
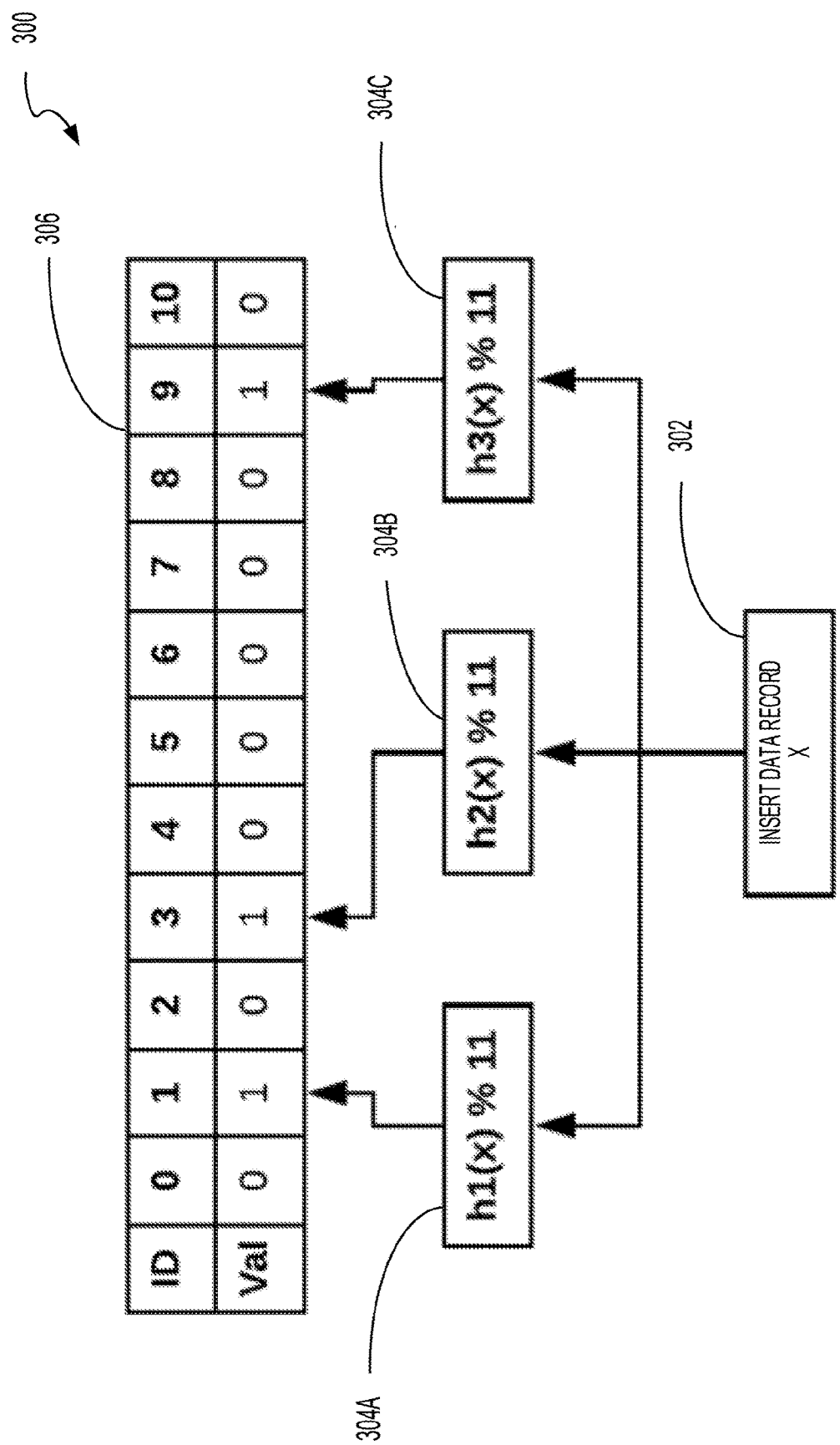
FIG. 3 depicts an illustrative example of updating a bloom filter.

Referring now to FIG. 3, depicted is an example illustration of a flow diagram 300 illustrating the insertion of a data record X into a bloom filter by at least one data processing system (e.g., at least one of the data processing systems 105, etc.). At block 302, the data processing system can indicate a data record to insert into the bloom filter. The indicated data record can be selected, for example, from a database (e.g., the database 125). The data processing system can select a number of hash functions, here illustrated as h1, h2, and h3. Although only three hash functions are shown, it should be understood that the data processing system can utilize any number of hash functions to insert a data record into a standard bloom filter. At blocks 304A-C, the data processing system can replicate and hash the data record X at least once using each of the identified hash functions. The hash functions can be, for example, ElGamal hashes, as described herein, or any other type of hash, such as SHA-1, SHA-2, MD5, among others. By replicating and hashing the data record X three times, the data processing system has generated three hashed data records, indicated in FIG. 3 as h1(x), h2(x), and h3(x). Still referring to blocks 304A-C, the data processing system can extract an index value from each of the hashed data records. The extracted index value can correspond to at least one respective position in the bloom filter. In the example provided in FIG. 3A, each hash is computed with the modulus of 11, which is the number of register positions in the bloom filter. Although only 11 register positions are used the bloom filter, it should be understood that any number of counting registers can be used to implement a bloom filter.

In further detail of FIG. 3, the modulus 11 of h1(x) is equal to 1, the modulus 11 of h2(x) is equal to 3 and the modulus 11 of h3(x) is equal to 9. Each of these values can be used by the data processing system as a pointer to the counter register associated with the respective position (e.g., ID value, etc.) in the bloom filter. For example, the modulus 11 of h1(x), equal to 1, can point to position '1' in the bloom filter, the modulus 11 of h2(x), equal to 3, can point to position '3' in the bloom filter, and so on. These are purely illustrative values for the purposes of illustrating the operations related to a bloom filter, and it should not be interpreted as limiting the scope of any implementations describing a bloom filter. The data processing system can update (e.g., insert the data record) the bloom filter by activating the bit each of the counter registers pointed to by the respective hash function, resulting in the updated bloom filter 306. Note that, although FIG. 3 depicts each counter register only incremented by one, it should be understood that the data processing system can increment any of the counter registers by any amount of value, for example by a number of bytes, bits, or relative to any other values, thresholds, or estimations described herein.

For the purposes of describing the ADBF implementations, an example ADBF implementing probabilistic counting and stochastic averaging (PSCA) is described.

PSCA based techniques can utilize a bit map data structure. A bit map data structure may be implemented several ways, such as a vector data structure with coordinates defined by registers and bit locations within registers, a vector-of-vectors data structure, among others. FIG. 4A illustrates a PCSA 3×2 bit map. Each cell value can be a bit equal to either 1 or 0. Here, the generic designators 'row' and 'column' are used to describe the location of a particular cell. Rows may also be referred to as registers. In a PSCA sketch, an identifier can be assigned to a cell based on its bit sequence. For example, each row can capture 1/nrows (⅓ in our example) fraction of the total universe identifiers. The column can have exponentially decayed fractions of the total universe identifiers. For example, column 1 can have ½, column 2 can have ¼, and so on. The cell thus captures 1/nrows*(½)^column_id fraction of the universe. An exemplary representation of a 3×2 PSCA sketch is included below.

The PCSA bit map can be flattened into a bit vector as illustrated in FIG. 4B. The vector arranges the cells in the order of columns. The first segment of 3 cells from the first column. They each captures ⅙ of universe ids. The second segment of 3 cells from the second column. They each capture 1/12 of the universe. It is clear that the bit map and the bit vector are equivalent and can be 1-1 mapped to each other.

The ADBF sketch can be a generalized form of such a sketch. The ADBF sketch can take any probability of the universe, as illustrated in its generic form in FIG. 4C.

Because the distribution of probabilities for each position in the sketch can be generalized to any value, other structures described herein can emerge as a result. For example, a classic bloom filter implementation emerges if all probabilities values are equally weighted to 1/m, where m is the number of positions in the sketch. Likewise, when 'waterfall' like probability is assigned to each segment, a PSCA-like sketch emerges. Further, when exponential p values are used, such that:

$$p_i = -c * \frac{\ln(i+1)}{m}$$

where i is the index of the position in the sketch, c is a normalization factor, and m is the number of positions in the sketch, a liquid legions type sketch emerges.

The exponential bloom filter case, described herein below, has closed form maximum likelihood solution with an elegant statistical model and interpretation. Next, ADBF and some theoretical formulation are described, including constructing ADBF from identifiers, adding noise, computing unique count of one ADBF, and computing unique count of many combined ADBFs. Simulation results to compare bloom filter, PCSA/CL, and ADBF are provided.

A generalized bloom filter (ADBF) can be constructed by the provider computing devices (e.g., the data processing system 105A-S) as follows. The kappa parameter is a tunable parameter that may be set to a value of one, but may be less than one. The data processing system can access one or more data records (e.g., identifiers and attributes, or identifiers that meet certain criteria, etc.) to utilize to construct the ADBF data structure. For example, the data processing system may access a database (e.g., the database 125, etc.) to access one or more data records to use to insert into a constructed ADBF sketch. The ADBF sketch can be maintained in the memory of the data processing system, and can me initialized to an initialization values as described herein in proceeding sections with respect to different sketch implementations. For example, the procedure to construct an ADBF sketch can be substantially similar to a cascading legions sketch or a liquid legions sketch, and may be based on parameters stored in the memory of the data processing system or received from another device.

After construction, data records can be mapped to positions in the ADBF using the following techniques. An ADBF sketch can be constructed to include a number of buckets k and any probability vector $(p_1, p_2, \ldots, p_k)$ where the sum of all $p_i$ where i ranges from 1 to k, is equal to kappa. The value for kappa can be equal to 1, but need not be equal to one. The probability vector is such that each coordinate in the probability vector can be assigned to a single bucket, or register, in the ADBF sketch. Each identifier of a data record (e.g., the data records maintained in the database 125, etc.) can be inserted into a bucket i of the ADBF sketch with probability $p_i$. In practice, let h be a hash identified by the data processing system 105 that maps the identifier space (e.g. the data record space, etc.) uniformly into (0, 2^64). Then, a data record x can be inserted into the bucket i if the expression $$\sum_{t=1}^{i-1} p_t \times 2^{64} \leq h(x) < \sum_{t=1}^{i} p_t \times 2^{64}$$

may be used interchangeably with the term "identifiers"), its corresponding NBF has element i=1 if at least one data record in the set is inserted into bucket i, and is equal to zero otherwise. Note that the liquid legions techniques described herein in Section D can be a case of ADBF such that the $p_i$'s are determined based on the exponential distribution.

To maintain the differentia privacy of their sketches, each of the provider computing devices (e.g., the data processing systems 105A-S, etc.) can flip certain bits with a predetermined probability. The process of flipping the bits to add noise can be referred to herein as 'blipping', and a sketch that has had noise introduced through probabilistic bit flipping is sometimes referred to as being 'blipped'. The estimator implemented by the data processing system (e.g., the data processing systems 105A-S, deduplication server 115, etc.) can be further extended to accurately compute the cardinality of the union of the noised (e.g. blipped) ADBF sketches generated by the data processing systems 105.

The BLIP techniques described in this section can be differential privacy safe. In particular, ADBF+BLIP is obtained by flipping each bucket of the raw NBF. Binary 0 can be flipped to binary 1 and binary 1 can be flipped to binary 0 with a same probability p. In some implementations, binary 0 values can be flipped to binary 1 with probability p and binary 1 values can be flipped t binary 0 with probability q.

The cardinality of the union of ABDF sketches can be estimated to determine a particular count or reach. The estimator can include, or retrieve, a series of tuning parameters from the memory of the computing device executing the estimator (e.g., the data processing system 105, deduplication server 115, etc.). The estimator, as executed, performed, or otherwise carried out by one or more computing devices described herein, can de-duplicate un-noised ADBF sketches (e.g., ADBF sketches that do not have noise incorporated, etc.). When merging un-noised ADBF sketches, observe that the ADBF of the union set, denoted as $b=[b_1, b_2, \ldots, b_k]$. For $1 \leq i \geq k$, $b_i=1$ if at least one data record from the union is mapped to that bucket, and is equal to zero otherwise. The method of moments can be used to estimate the union from $b_1, b_2, \ldots, b_k$. Note that $p_i$ is used to denote the probability of any data record being mapped to into bucket i. Considering the union cardinality of u, the probability that none of the u data records falls in bucket i equals $(1-p_i)^u$. That is, $P(b_i=0)=(1-p_i)^u$, and thus $F(b_i=1|u)=1-(1-p_i)^u$. Therefore, the total number of ones has an expectation $$E\left(\sum_{i=1}^{k} b_i \mid u\right) = \sum_{i=1}^{k} [1 - (1 - p_i)^u].$$

Hence, by plugging in the observed $b_i$'s, an estimate of u can be obtained.

Figure 5:
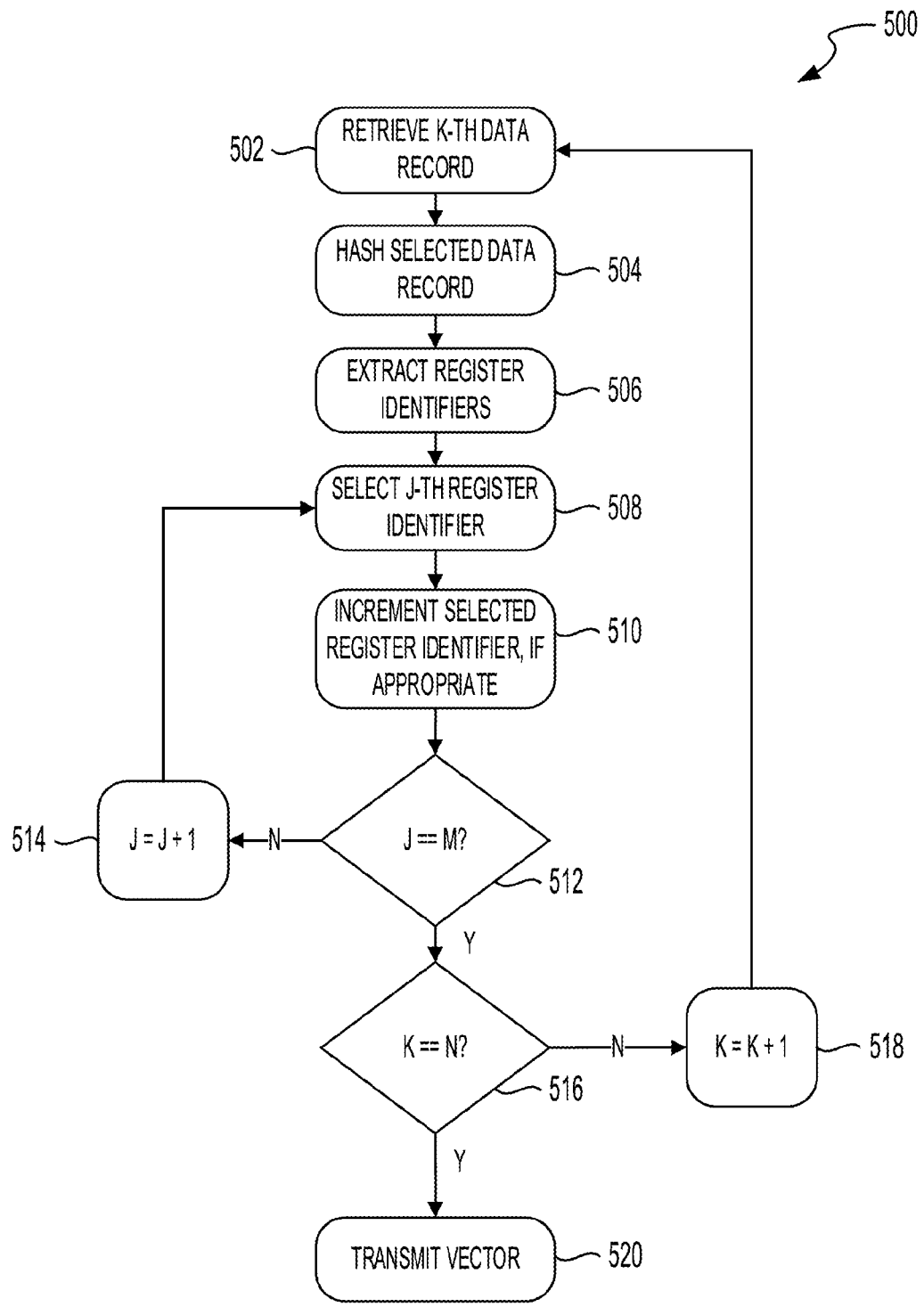
FIG. 5 depicts a flow diagram of a process for encoding a data set into an any distribution bloom filter.

Referring now to FIG. 5, a process 500 is shown for generating and updating an any distribution bloom filter. Although process 500 is illustrated in FIG. 5 as updating a single bloom filter (BF), process 500 may be incorporated in, and therefore incorporate any features described in relation to, process 200 as described above. For example, process 500 may be integrated into process 200 to perform step 208 for various vectors in the set of vector data structures, depending on which vector is selected for a given entry. Process 500 may be performed by one or more processors coupled to a memory, such as any of data processing systems 105.

At 502, a k-th data entry in a set of N data entries is retrieved for encoding into a BF. The k-th data entry may define an identifier to be encoded into the BF. At 504, the identifier is hashed using one or more hashing functions. The one or more hashing functions are configured to receive the identifier as input and output a hash value based on the input that defines a coordinate in the BF. At 506, M coordinates in the BF are identified based on the one or more outputs of the one or more hash functions. In some implementations, the one or more outputs of the one or more hash functions may be passed through a modulus operator to convert the outputs to a valid coordinate in the BF.

The one or more coordinates identified at 506 may then be iterated through to update the BF (represented by the counter j). At 508, the counting register corresponding to the j-th coordinate is selected. In some implementations, the j-th coordinate defines a memory location of the corresponding counting register. At 510, the selected register is incremented to encode the k-th identifier, if appropriate. For example, if the selected register currently holds a binary value of 0, the register may be incremented to hold a value of binary 1. As a counter example, if the selected register currently holds a binary value of 1, the register may not be incremented since the register already holds the binary 1 value. The determination at 512 iterates over the M identified coordinates for the k-th identifier. If the criteria at 512 is not met, step 514 is executed to increment the j counter and repeat steps 508-512 for the next coordinate.

If the criteria at 512 is satisfied, then the process 500 is continued at decision 516. Decision 516 determines whether all data entries have been encoded into the BF. If the criteria at 516 is not satisfied, then the counter k is incremented at 518 and the process 500 repeated for the next data entry. If the criteria at 516 is satisfied, then the update of the BF is complete and the vector may be transmitted to a processing system or otherwise output to storage at 520.

Figure 6:
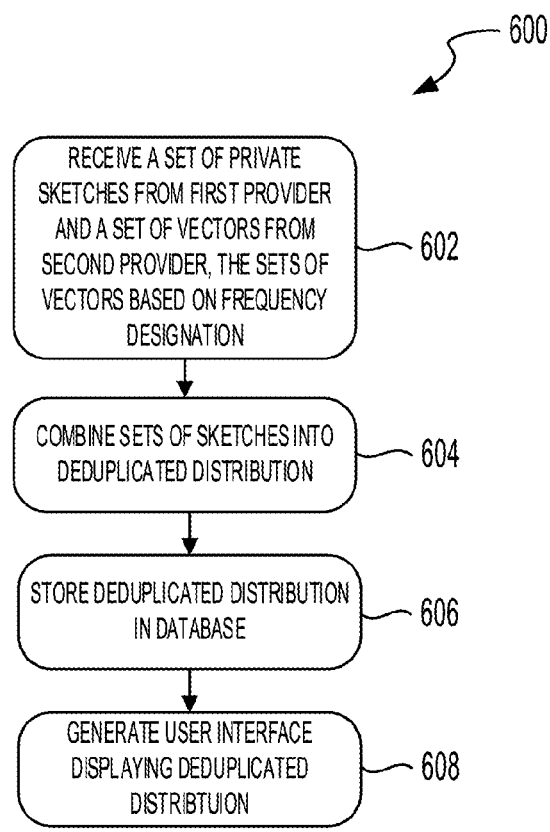
FIG. 6 depicts a flow diagram of a process for deduplicating data sets from a plurality of providers to generate a single distribution.

Referring now to FIG. 6, a process 600 is shown for aggregating data sets from multiple providers to generate a deduplicated data set. Process 600 may be implemented by one or more processors coupled with a memory, such as deduplication server 115 or a data processing system 105. Process 600 may be executed by a central server device that facilitates the implementation of a privatized data-exchange protocol between a plurality of providers, or may be executed by an individual provider in the plurality of providers. Generally, process 600 combines sets of private sketches generated by processing systems of a first provider and a second provider, which may be generated via process 200, for example. Although the process 600 is illustrated as only including data sets from two providers, process 600 can include data sets from any number of providers to generate the deduplicated distribution.

At 602, a first set of private sketches is received from the first provider and a second set of private sketches is received from the second provider. Each private sketch in the first set of private sketches and the second set of private sketches encode identifiers associated in interactions with each of the first provider and the second provider, and each private sketch corresponds to a particular frequency or frequency range. The private sketches may be configured and received as vector data structures, such as a VoC or ADBF. The private sketches may be differentially private such that identifiers of users encoded in the private sketches may be obscured.

At 604, a combined, deduplicated distribution is generated using the first set of private sketches and the second set of private sketches. Several methods may be performed to generate the deduplicated data set. In one implementation, the first set of private sketches is combined with the second set of private sketches to generate a merged set of private sketches that deduplicates the two data sets. The total distribution can then be estimated from the merged set of private sketches. In another implementation, the per-frequency distribution can be estimated directly from the sets of private sketches using set operations such as intersections, unions, and set differences between individual sketches.

At 606, the deduplicated distribution is stored in a database. In some implementations, the database is accessible to the plurality of provider processing systems for review. A technical advantage is realized in process 600 in that the two data sets encoded into the two sets of private sketches is reduced to a single, deduplicated data set. The single data set thus reduces the size and complexity of the memory requirements of storing the distribution data across the plurality of providers since less data is required to be stored to maintain the same or nearly the same information. At 608, a user interface can be generated to display a representation of the deduplicated distribution. The user interface may be outputted on a display associated with the processing system or sent to a separate processing device for display.

In some implementations, a frequency designation is transmitted to the first provider and the second provider. The frequency designation may generally indicate one or more parameters of the privatized data-exchange protocol. In some implementations, the frequency designation may define a maximum frequency threshold k indicating that k private sketches are requested from each provider that each correspond to a frequency bin in the set $\{1, 2, \ldots, k-1, k+\}$. In some implementations, a frequency designation is transmitted to each provider via an "offline" medium, e.g., via an in-person meeting or verbal agreement, and thus step 602 is not required to be executed.

A few methods for deduplication will be described in further detail below.

One method for estimating the per-frequency reach $R_k$ is to use a sequential merge algorithm. A sequential merge algorithm merges sketches from a first provider and a second provider to create a first set of merged sketches, which is then merged with the sketches from a third provider, and so on until all s providers have been merged. The aggregation of the final set of merged sketches is used to obtain the total distribution.

A sequential merge algorithm can be represented generally as the following.

Assume a first provider publishes a first set of sketches $\{x_1, x_2, \ldots, x_{k-1}, x_{k+}\}$ and a second provider publishes a second set of sketches $\{y_1, y_2, \ldots, y_{k-1}, y_{k+}\}$.

First, a sketch is generated for each provider to represent the frequency reach of 1+. Given the sketches of each provider are disjointed, the 1+ sketches can be generated as:

$$x_{1+} = x_{k+} + \sum_{j=1}^{k-1} x_j$$

and $$y_{1+} = y_{k+} + \sum_{j=1}^{k-1} y_j$$

For a particular frequency j less than k, the jth sketch representing the combination of the first provider and the second provider can computed as:

$$z_j = \bigcup_{i=1}^{j-1}(x_i \cap y_{j-1}) \cup x_j \cup y_j \setminus (x_{1+} \cap y_j) \setminus (x_j \cap y_{1+})$$

where ($\cup$) is the union operator, ($\cap$) is the intersect operator, and (\) is the set different operator. This formula is repeated for values of j from 1 to k−1 to generate k−1 sketches.

To generate the combined sketch of k+, the combination can be computed as:

$$z_{k+} = x_{k+} \cup \bigcup_{j=0}^{k-1}\left[(x_j \cap y_{k+}) \cup \bigcup_{i=1}^{j}(x_j \cap y_{k-i})\right]$$

Note that the above equation contemplates the intersection of $x_0$ and $y_{k+}$, which can be obtained from the equation:

$$(x_0 \cap y_{k+}) = y_{k+} \setminus (x_{1+} \cap y_{k+})$$

Thus, k sketches can be generated as a combination of the sets of sketches of the first and second providers, represented by the set $\{z_1, z_2, \ldots, z_{k-1}, z_{k+}\}$. To merge additional providers in the group of s providers, the sequential merge method may be repeated recursively by combining the combination set $\{z_1, z_2, \ldots, z_{k-1}, z_{k+}\}$ and the sketches generated by a third provider, then a fourth provider, and so on. After combining the s sets of sketches from the s providers, the final combination set $\{\hat{z}_1, \hat{z}_2, \ldots, \hat{z}_{k-1}, \hat{z}_{k+}\}$ may be used to generate the final distribution across all providers.

Figure 7:
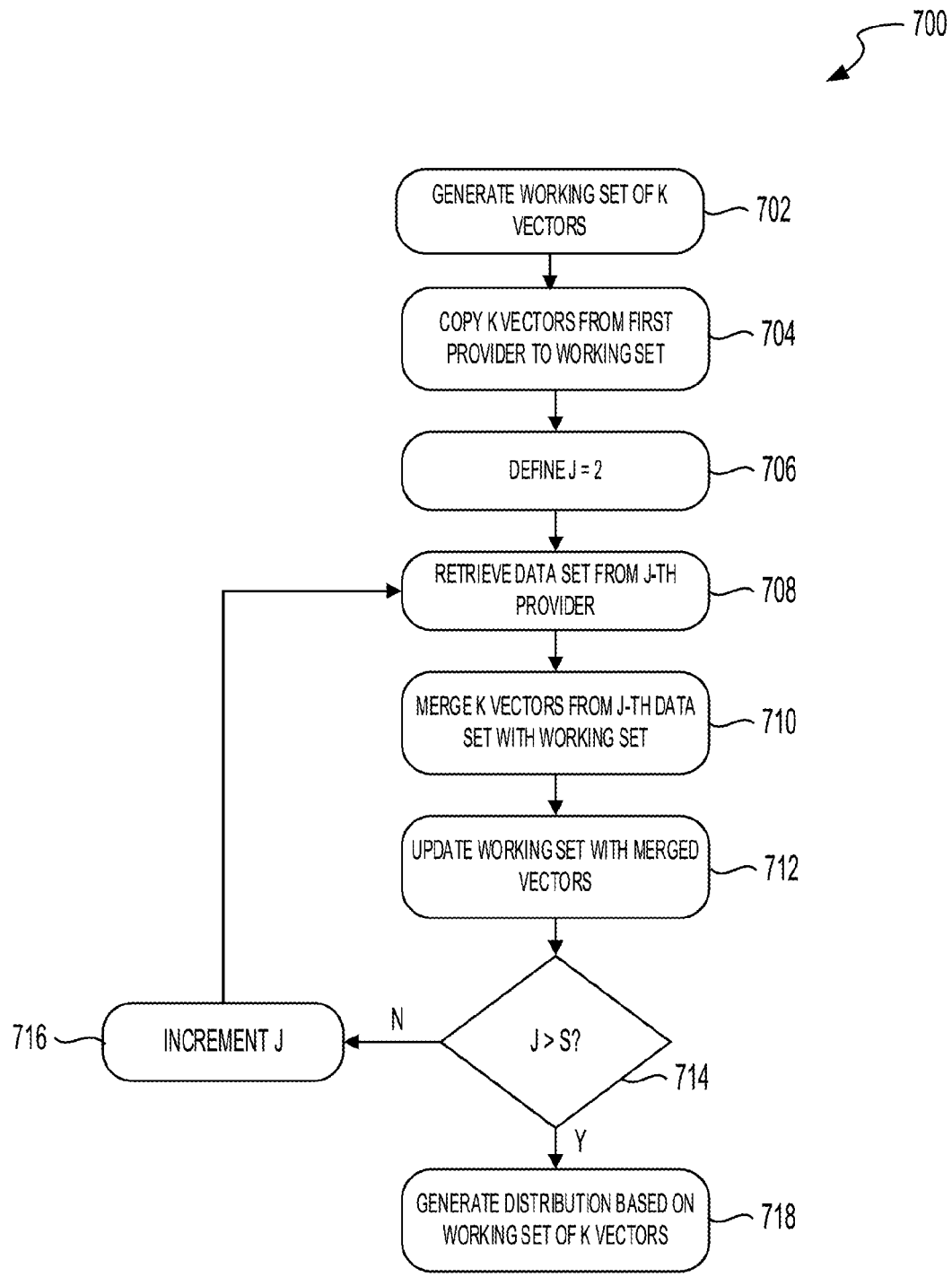
FIG. 7 depicts a flow diagram for sequentially merging sets of private sketches to generate a single set of private sketches.

Referring now to FIG. 7, the process 700 generally illustrates the above methodology for sequentially merging k sketches from each of s providers.

At 702, a set of empty vectors is generated to serve as a working set of vectors through the recursive merge operation of process 700. The set of empty vectors contains the same number of vectors as the agreed upon protocol of the plurality of providers and is configured in the same way as the vectors received from the plurality of providers. At 704, the k vectors received from a first provider of the plurality of providers is copied into the working set of vectors. In some implementations, the first provider may be selected from the plurality of providers randomly.

At 706, a counter j is defined to iterate through the remaining s−1 providers. The counter j is shown to be initialized at 2 such that the first provider is excluded from iteration. At 708, the set of vectors from the j-th provider is retrieved. Then, at 710, the k vectors from the j-th provider are combined with the k vectors in the working set to generate a merged set of vectors. The two sets of k vectors can be combined using the above described equations. At 712, the merged set of k vectors is then stored as the working set of vectors. Accordingly, the update at 712 may replace the previous working set with the most recent set of merged vectors.

At 714, a determination is made whether all providers in the group of s providers have been merged into the working set of vectors. If the determination at 714 is that not all providers have been merged, then the counter j is incremented at 716 and the steps 708-714 are repeated for the next provider. Thus, each set of private sketches is sequentially merged with the previous set of merged vectors (i.e., the working set) until all data sets are merged. At such determination at decision 714, the final distribution is estimated at 718 based on the working set of k vectors. As described above, the per-frequency distribution may be estimated based on a cardinality estimation of each sketch.

Figure 8A:
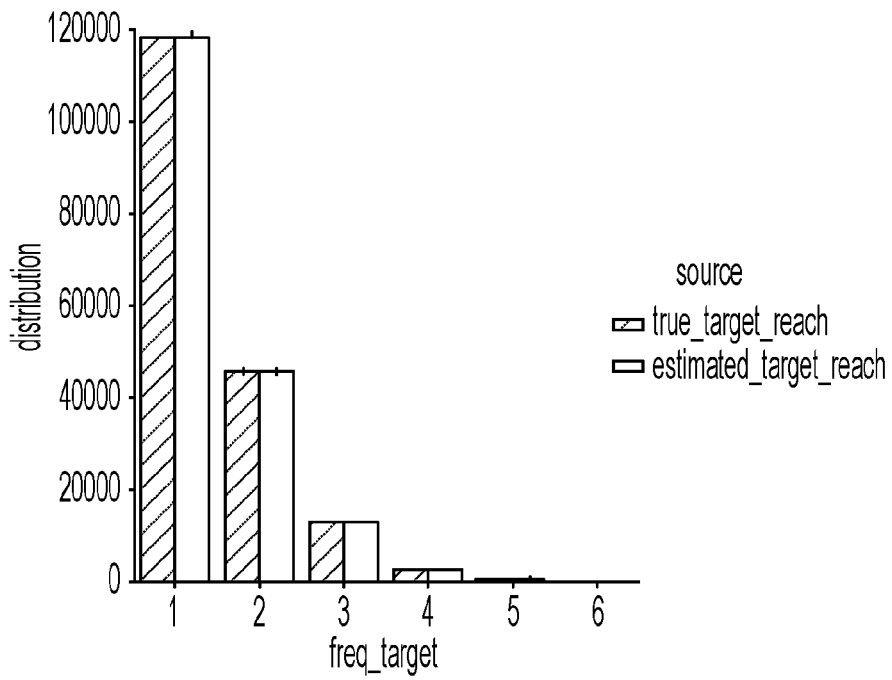
FIGS. 8A-D depict example data graphs illustrating the comparison of various experimental parameters of the system and their impact on resulting computation using a sequential merge algorithm.

Referring to FIG. 8A, an example histogram is presented for comparing the estimated distribution of a first test set generated using a sequential merge algorithm to the actual (true) distribution of the first test set. Here, the first test set represents a universe size of 200,000 total identifiers, vectors comprising 2^14 buckets, deduplication of two providers with independent data sets (i.e., no overlap between the data sets), and a maximum frequency of 5 (where the fifth frequency bin represents "5+").

Figure 8B:
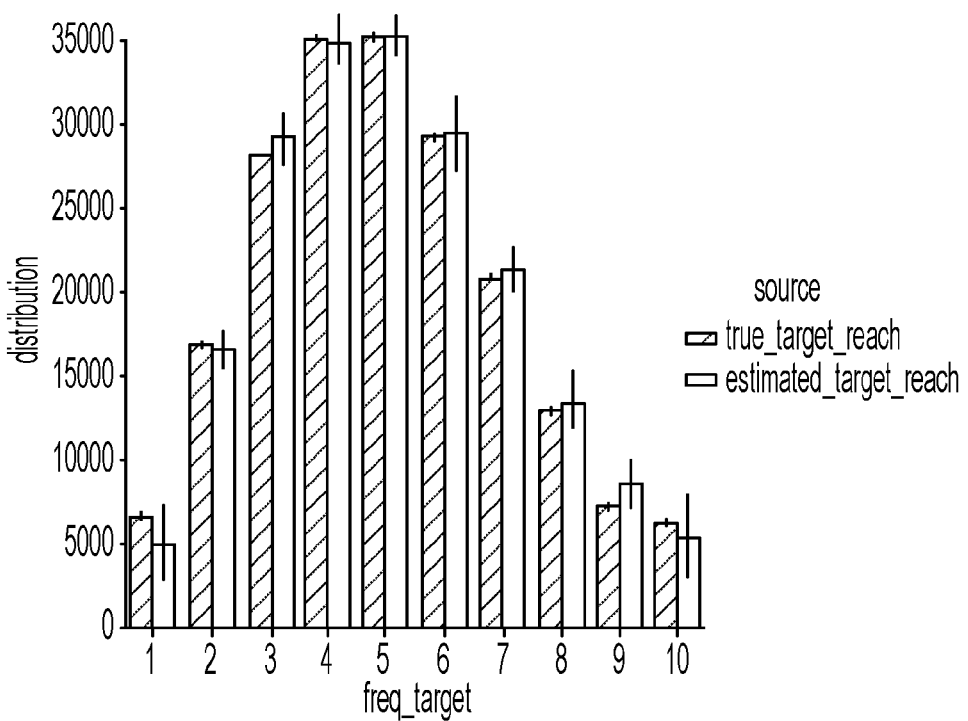

Referring to FIG. 8B, another example histogram is presented comparing the estimated distribution of a second test set generated using a sequential merge algorithm to the actual (true) distribution of the second test set. Here, the second test set represents a universe size of 200,000 total identifiers, vectors comprising 2^14 buckets, deduplication of five providers, no added DP noise, and a maximum frequency of 10 (where the tenth frequency bin represents "10+").

Figure 8C:
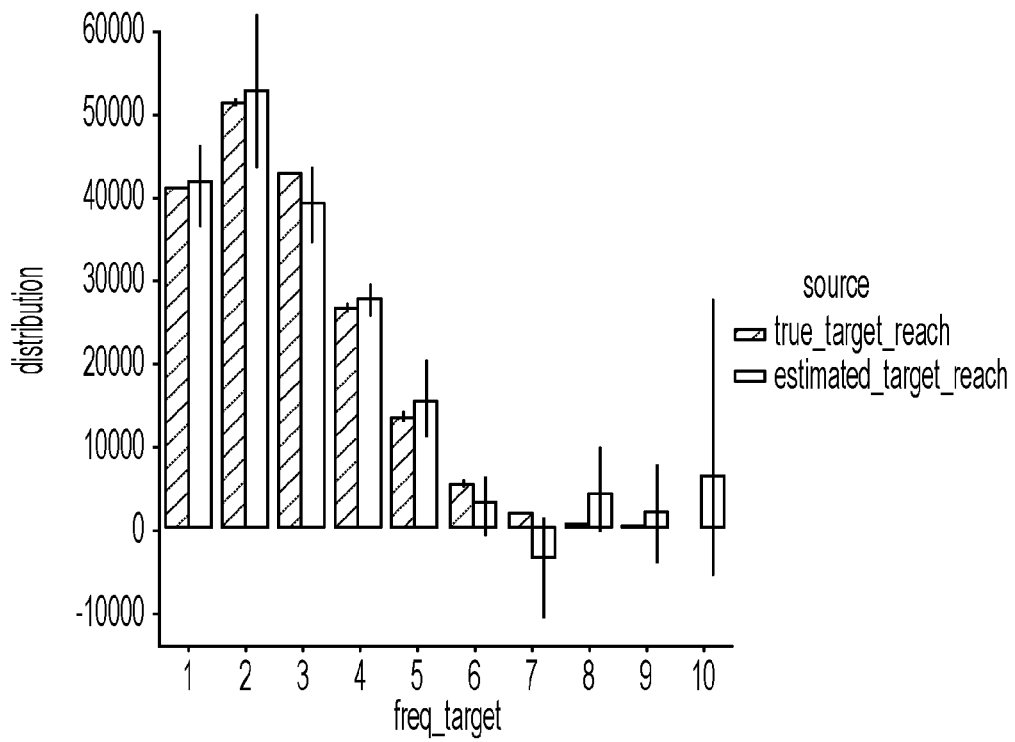

FIG. 8C illustrates the test data of the second test set of FIG. 8B, with the addition of DP-noise $\varepsilon = \log(3)$ introduced initially into each sketch prior to combination.

Figure 8D:
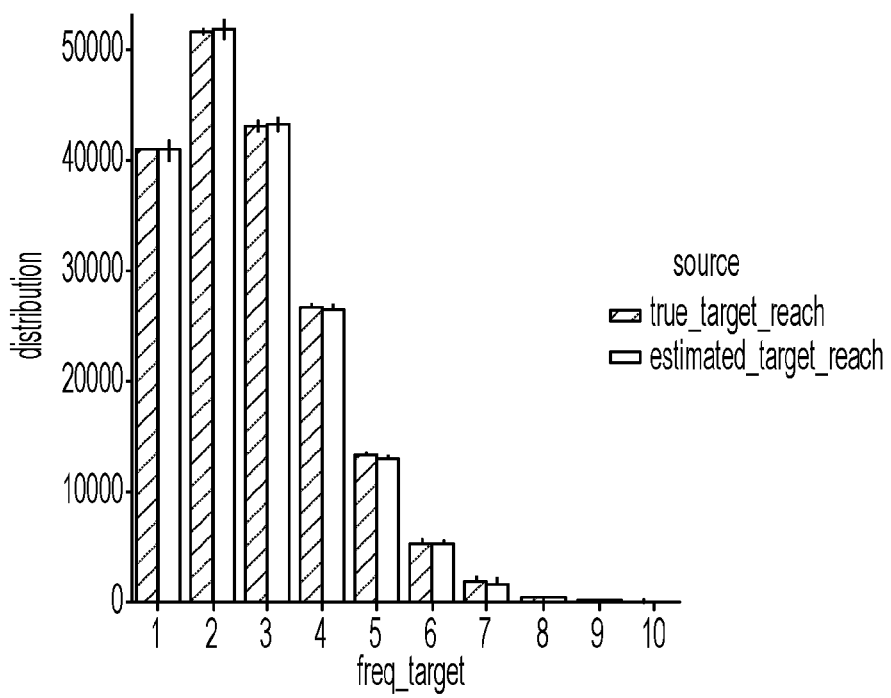

FIG. 8D illustrates another example histogram comparing the estimated distribution of a third test set generated using a sequential merge algorithm to the actual (true) distribution of the third test set. Here, the third test set represents a universe size of 200,000 total identifiers, vectors comprising 2^14 buckets, deduplication of five providers, DP-noise $\varepsilon = \log(3)$, and a maximum frequency of 10 (where the tenth frequency bin represents "10+").

Another method for combining the private sketches of the s providers is based on the Chow-Liu model. To calculate the per-frequency reach of a frequency bin k, $$R(f_1 + f_2 + \ldots + f_s = k) = \sum_{j_1 + j_2 + \ldots + j_s = k} \hat{R}(f_1 = j_1, f_2 = j_2, \ldots, f_s = j_s)$$

Here, R(*) represents the number of users (i.e., reach) satisfying a particular condition (*), and j is a user's frequency at the j-th provider.

Using the Chow-Liu model, an estimate of each term $R(f_1 = j_1, f_2 = j_2, \ldots, f_s = j_s)$ can be found based on the formula:

$$P(f_1 = j_1, f_2 = j_2, \ldots, f_s = j_s) =$$
$$P(f_1 = j_1) * P(f_2 = j_2 \mid f_1 = j_1) * \ldots * P(f_s = j_s \mid f_{s-1} = j_{s-1})$$

which implies:

$$\hat{R}(f_1 = j_1, f_2 = j_2, \ldots, f_s = j_s) =$$
$$R(f_1 = j_1) * R(f_2 = j_2 \mid f_1 = j_1) * \ldots * R(f_s = j_s \mid f_{s-1} = j_{s-1})$$

and can be rewritten:

$$\hat{R}(f_1 = j_1, f_2 = j_2, \ldots, f_s = j_s) =$$
$$R(f_1 = j_1) * \frac{R(f_1 = j_1, f_2 = j_2)}{R(f_1 = j_1)} * \ldots * \frac{R(f_{s-1} = j_{s-1}, f_s = j_s)}{R(f_{s-1} = j_{s-1})}$$

Note that the Chow-Liu model assumes an arbitrary linear tree of providers. In particular, the linear tree from $1 \to 2 \to \ldots \to s$ creates pairwise-overlaps between adjacent providers in the linear sequence.

There exists conditions in which at least one value in $(j_1, j_2, \ldots, j_s)$ used to calculate R is equal to zero; however, due to privacy concerns, individual providers do not know the list of individuals with which they have not interacted (i.e., frequency zero). A pairwise-overlap in which one of the two frequency values is zero can be calculated as:

$$R(f_u = 0, f_v = j_v) = R(f_v = j_v) - R(f_u \geq 1, f_v = j_v)$$

When multiple values in $(j_1, j_2, \ldots, j_s)$ used to calculate R are equal to zero, providers in the linear tree can be rearranged such that all providers with a value of j equal to zero are moved to the beginning of the linear tree. Suppose that after rearranging the linear tree, the first q providers all have frequency values of $(f_1, f_2, \ldots, f_q=0)$ leaving the remaining providers in the tree with non-zero values for $(f_{q+1}, f_{q+2}, \ldots, f_s)$. Derivation of the Chow-Liu model shows that:

$$P(f_1 = j_1, f_2 = j_2, \ldots, f_s = j_s) =$$
$$P(f_1 = \ldots = f_q = 0) * P(f_{q+1} = j_{q+1} | f_q = 0) * \ldots * P(f_s = j_s | f_{s-1} = j_{s-1}) =$$
$$P(f_1 = \ldots = f_q = 0, f_{q+1} = j_{q+1}) * \ldots * P(f_s = j_s | f_{s-1} = j_{s-1}) =$$
$$[P(f_{q+1} = j_{q+1}) - P(f_1 + \ldots + f_q \geq 1, f_{q+1} = j_{q+1})] *$$
$$\ldots * P(f_s = j_s | f_{s-1} = j_{s-1})$$

Which can then be used to calculate $\hat{R}$ by:

$$P(f_1 = j_1, f_2 = j_2, \ldots, f_s = j_s) =$$
$$[R(f_{q+1} = j_{q+1}) - R(f_1 + \ldots + f_q \geq 1, f_{q+1} = j_{q+1})] *$$
$$R(f_{q+2} = j_{q+2} | f_{q+1} = j_{q+1}) * \ldots * R(f_s = j_s | f_{s-1} = j_{s-1})$$

Accordingly, an analytic system can deduplicate private sketches from a group of s providers to estimate a total reach distribution across the entire group using the above described algorithm.

Figure 9B:
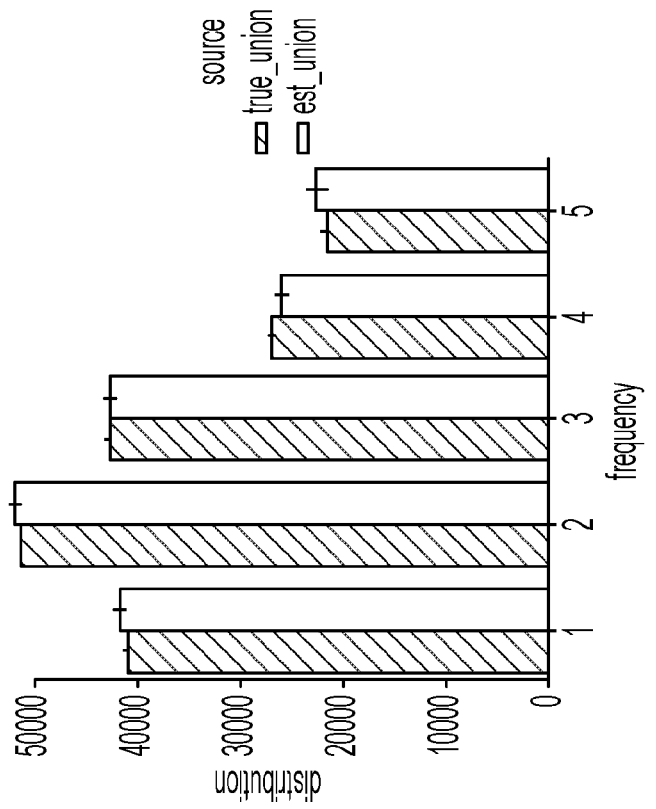
FIGS. 9A-B depict example data graphs illustrating the comparison of various experimental parameters of the system and their impact on resulting computation using a pairwise-overlap algorithm.
Figure 9A:
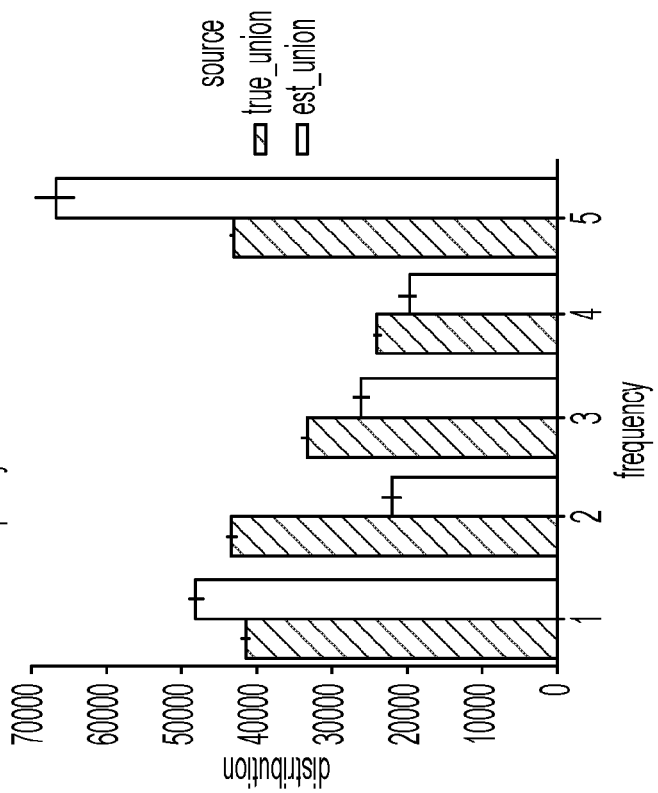

With reference to FIG. 9A, an example histogram is presented for comparing the estimated distribution of a first test set generated using a pairwise-overlap algorithm to the actual (true) distribution of the first test set. Here, the first test set represents a universe size of 200,000 total identifiers, vectors comprising 2^14 buckets, deduplication of five providers generated using independent Poisson models, and a maximum frequency of 5 (where the fifth frequency bin represents "5+").

FIG. 9B, illustrates another example histogram comparing the estimated distribution of a second test set generated using a pairwise-overlap algorithm to the actual (true) distribution of the second test set. Here, the second test set represents a universe size of 200,000 total identifiers, vectors comprising 2^14 buckets, deduplication of five providers generated using reversed correlated data sets, and a maximum frequency of 5 (where the fifth frequency bin represents "5+"). The second test set is designed to stress test the pairwise-overlap algorithm.

A third method for estimating the per-frequency reach $R_k$ is based on the independence assumption. The independence assumption requires a value of the universe size (U) which can be estimated by a worker or analyst.

Again breaking down the formula for per-frequency reach $R_k$, the independence-model can be calculated as follows:

$$R(f_1 + f_2 + \ldots + f_s = k) = \sum_{j_1+j_2+\ldots+j_s=k} \hat{R}(f_1 = j_1, f_2 = j_2, \ldots, f_s = i_s)$$

where $\hat{R}$ is calculated, using the independence assumption, as:

$$\hat{R}(f_1 = j_1, f_2 = j_2, \ldots, f_s = j_s) = \frac{\hat{R}(f_1 = j_1) * \hat{R}(f_2 = j_2) * \ldots * \hat{R}(f_s = j_s)}{U^{s-1}}$$

Put another way, the per-frequency counts provided by each provider can be estimated from individual sketches and input directly into the above formula to estimate the per-frequency distribution across the group of providers. An analytic system can thus be configured with logic that implements the above equations to combine per-frequency reach data from each provider and generate an estimated distribution of a deduplicated data set.

FIG. 10 illustrates a depiction of a computer system 1000 that can be used, for example, to implement an illustrative data processing system 105, an illustrative deduplication server 115, an illustrative analyst device 120, an illustrative client device 135, and/or various other illustrative systems described in the present disclosure. Computing system 1000 includes a bus 1005 or other communication component for communicating information and a processor 1010 coupled to bus 1005 for processing information. Computing system 1000 also includes main memory 1015, such as a random access memory (RAM) or other dynamic storage device, coupled to bus 1005 for storing information, and instructions to be executed by processor 1010. Main memory 1015 can also be used for storing position information, temporary variables, or other intermediate information during execution of instructions by processor 1010. Computing system 1000 may further include a read only memory (ROM) 1020 or other static storage device coupled to bus 1005 for storing static information and instructions for processor 1010. A storage device 1025, such as a solid state device, magnetic disk or optical disk, is coupled to bus 1005 for persistently storing information and instructions.

Computing system 1000 may be coupled via bus 1005 to a display 1035, such as a liquid crystal display, or active matrix display, for displaying information to a user. An input device 1030, such as a keyboard including alphanumeric and other keys, may be coupled to bus 1005 for communicating information, and command selections to processor 1010. In another implementation, input device 1030 has a touch screen display 1035. Input device 1030 can include a cursor control, such as a mouse, a trackball, or cursor direction keys, for communicating direction information and command selections to processor 1010 and for controlling cursor movement on display 1035.

In some implementations, computing system 1000 may include a communications adapter 1040, such as a networking adapter. Communications adapter 1040 may be coupled to bus 1005 and may be configured to enable communications with a computing or communications network 1045 and/or other computing systems. In various illustrative implementations, any type of networking configuration may be achieved using communications adapter 1040, such as wired (e.g., via Ethernet®), wireless (e.g., via WiFi®, Bluetooth®, etc.), pre-configured, ad-hoc, LAN, WAN, etc.

According to various implementations, the processes that effectuate illustrative implementations that are described herein can be achieved by computing system 1000 in response to processor 1010 executing an arrangement of instructions contained in main memory 1015. Such instructions can be read into main memory 1015 from another computer-readable medium, such as storage device 1025. Execution of the arrangement of instructions contained in main memory 1015 causes computing system 1000 to perform the illustrative processes described herein. One or more processors in a multi-processing arrangement may also be employed to execute the instructions contained in main memory 1015. In alternative implementations, hard-wired circuitry may be used in place of or in combination with software instructions to implement illustrative implementations. Thus, implementations are not limited to any specific combination of hardware circuitry and software.

The systems and methods as described in the present disclosure may be implementable for any type of third-party content item (i.e., for any type of content item to be displayed on a resource). In one implementation, the content items may include advertisements. In one implementation, the content items may include any text, images, video, stories (e.g., news stories), social media content, links, or any other type of content provided by a third-party for display on the resource of a first-party content provider. The type of content item for which the content visibility methods herein are used for is not limiting.

Although an example processing system has been described in FIG. 10, implementations of the subject matter and the functional operations described in this specification can be carried out using other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or any combination thereof. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, flash memory, solid-state memory, or other storage devices).

The features disclosed herein may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device", "client device", "worker device", "worker", "worker computing device", "publisher", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or any combination thereof. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, functional, or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, flash memory, solid-state drives, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD- ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a cloud computing environment.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, Python, C, C++, C #, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for generating a data structure for deduplicating data sets across a plurality of providers, the method comprising:
   maintaining, by a data processing system comprising one or more processors and a memory, in a database, a data set of records each identifying interactions between a plurality of users and a provider of the plurality of providers;
   initializing, by the data processing system, a plurality of vector data structures, wherein each vector data structure of the plurality of vector data structures corresponds to a respective frequency of a plurality of frequencies;
   determining, by the data processing system, for each user of the plurality of users, frequency data of the interactions between the user and the provider based on the data set of records, the frequency data of the user representing a number of the interactions between the user and the provider that have a target interaction type;
   updating, by the data processing system, the plurality of vector data structures based on the frequency data of each user of the plurality of users, wherein a first vector data structure of the plurality of vector data structures corresponds to a first frequency value of the plurality of frequencies and is updated to encode an identifier of a user of the plurality of users having frequency data indicating a number of interactions that matches the first frequency value, such that the plurality of vector data structures are differentially private; and
   sending, by the data processing system, the plurality of vector data structures to an analysis server for deduplication of the data set of records across the plurality of providers, wherein deduplication of the plurality of vector data structures comprises generating a data structure comprising a deduplicated frequency distribution that defines a total number of user interactions having the target interaction type across plurality of providers for each respective frequency of the plurality of frequencies.

2. The method of claim 1, wherein the analysis server combines the plurality of vector data structures with a second plurality of vector data structures from a second provider to generate a deduplicated distribution.

3. The method of claim 1, wherein each of the plurality of vector data structures define coordinates for a plurality of counters, wherein updating the plurality of vector data structures comprises updating at least one counter in the plurality of vector data structures to encode the identifier of the user.

4. The method of claim 3, wherein updating the plurality of vector data structures further comprises determining a first coordinate of the plurality of vector data structures based on a hash function of the identifier of the user.

5. The method of claim 1, wherein the plurality of vector data structures each correspond to a particular frequency between one and a defined frequency threshold.

6. The method of claim 5, wherein identities of the plurality of users are encoded into no more than one vector data structure of the plurality of vector data structures.

7. A method for deduplicating data sets corresponding to frequencies of user interaction with a plurality of providers, the method comprising:
   receiving, by a data processing system comprising one or more processors and one or more memories, a first set of two or more vector data structures from a first provider of the plurality of providers, each of the first set of two or more vector data structures encoding, with differential privacy, user identifiers associated with a number of interactions with the first provider, having a target interaction type, that matches a respective frequency of each of the first set of two or more vector data structures;
   receiving, by the data processing system, a second set of two or more vector data structures from a second provider of the plurality of providers, each of the second set of two or more vector data structures encoding, with differential privacy, user identifiers associated with a number of interactions with the second provider, having the target interaction type, that matches a respective frequency of each of the second set of two or more vector data structures; and
   combining, by the data processing system, the first set of two or more vector data structures and the second set of two or more vector data structures into a deduplicated frequency distribution that defines a total number of user interactions having the target interaction type across both the first provider and the second provider for each respective frequency of a plurality of frequencies.

8. The method of claim 7, further comprising generating, by the data processing system, graphical user interface data comprising a representation of the deduplicated frequency distribution.

9. The method of claim 7, further comprising sending, by the data processing system, a threshold frequency to the plurality of providers, wherein the plurality of frequencies are defined by the threshold frequency.

10. The method of claim 9, wherein the first set of two or more vector data structures and the second set of two or more vector data structures each correspond to a particular frequency between one and the threshold frequency.

11. The method of claim 10, wherein the user identifiers are encoded into no more than one vector data structure of the first set of two or more vector data structures and no more than one vector data structure of the second set of two or more vector data structures.

12. The method of claim 7, wherein the first set of two or more vector data structures and the second set of two or more vector data structures are vectors of counts (VOCs).

13. The method of claim 7, wherein the first set of two or more vector data structures and the second set of two or more vector data structures are any distribution bloom filters (ADBF).

14. The method of claim 7, wherein combining the first set of two or more vector data structures and the second set of two or more vector data structures into the deduplicated frequency distribution comprises:
combining, by the data processing system, the first set of two or more vector data structures and the second set of two or more vector data structures into a first combined set of two or more vector data structures;
receiving, by the data processing system, a third set of two or more vector data structures from a third provider of the plurality of providers; and
responsive to combining the first set of two or more vector data structures and the second set of two or more vector data structures into the first combined set of two or more vector data structures, combining, by the data processing system, the first combined set of two or more vector data structures with the third set of two or more vector data structures from the third provider into a second combined set of two or more vector data structures.

15. The method of claim 7, wherein combining the first set of two or more vector data structures and the second set of two or more vector data structures into the deduplicated frequency distribution comprises:
determining an intersection between a first vector data structure of the first set of two or more vector data structures and a second vector data structure of the second set of two or more vector data structures;
determining a number of users encoded in the intersection of the first vector data structure and the second vector data structure; and
updating the deduplicated frequency distribution based on the determined number of users.

16. A system for reducing data sets received from a plurality of providers, the system comprising:
a network interface configured to communicate with a plurality of servers associated with the plurality of providers; and
one or more processors coupled to the network interface and a memory, the memory comprising instructions stored thereon that, when executed by the one or more processors, cause the one or more processors to:
receive, via the network interface, a first set of differentially private sketches from a first provider of the plurality of providers, each of the first set of differentially private sketches encoding, with differential privacy, user identifiers associated with a number of interactions with the first provider, having a target interaction type, that matches a respective frequency of each of the first set of differentially private sketches;
receive, via the network interface, a second set of differentially private sketches from a second provider of the plurality of providers, each of the second set of differentially private sketches encoding, with differential privacy, user identifiers associated with a number of interactions with the second provider, having the target interaction type, that matches a respective frequency of each of the second set of differentially private sketches;
generate a combined distribution using the first set of differentially private sketches and the second set of differentially private sketches, the combined distribution deduplicating the data sets represented by the first set of differentially private sketches and by the second set of differentially private sketches and defining a total number of user interactions having the target interaction type across both the first provider and the second provider for each respective frequency of a plurality of frequencies; and
store, in a database, the combined distribution.

17. The system of claim 16, wherein the one or more processors are further caused to:
combine the first set of differentially private sketches and the second set of differentially private sketches into a merged set of differentially private sketches; and
store, in the database, the merged set of differentially private sketches.

18. The system of claim 17, wherein the one or more processors are further caused to:
receive a third set of differentially private sketches from a third provider of the plurality of providers;
combine the merged set of differentially private sketches and the third set of differentially private sketches to generate a new merged set of differentially private sketches; and
store, in the database, the new merged set of differentially private sketches.

19. The system of claim 16, wherein the first set of differentially private sketches and the second set of differentially private sketches are vectors of counts (VOCs).

20. The system of claim 16, wherein the first set of differentially private sketches and the second set of differentially private sketches are any distribution bloom filters (ADBF).

* * * * *